United States Patent
Kurian et al.

(10) Patent No.: US 9,959,097 B2
(45) Date of Patent: May 1, 2018

(54) SVN INTERFACE SYSTEM FOR HETEROGENEOUS DEVELOPMENT ENVIRONMENTS

(71) Applicant: Bank of America Corporation, Charlotte, NC (US)

(72) Inventors: Manu Kurian, Dallas, TX (US); Paul Roscoe, Treuddyn Flintshire (GB)

(73) Assignee: Bank of America Corporation, Charlotte, NC (US)

( * ) Notice: Subject to any disclaimer, the term of this patent is extended or adjusted under 35 U.S.C. 154(b) by 239 days.

(21) Appl. No.: 15/065,196

(22) Filed: Mar. 9, 2016

(65) Prior Publication Data
US 2017/0262260 A1    Sep. 14, 2017

(51) Int. Cl.
G06F 9/44       (2006.01)
G06F 9/45       (2006.01)

(52) U.S. Cl.
CPC ............... *G06F 8/10* (2013.01); *G06F 8/427* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 7,778,866 B2* | 8/2010 | Hughes | ...................... | G06F 8/20 705/7.42 |
| 8,037,452 B2* | 10/2011 | Minium | ...................... | G06F 8/71 715/229 |
| 8,539,282 B1* | 9/2013 | Kabanov | ............. | G06F 11/3688 702/182 |
| 8,990,249 B1* | 3/2015 | Nogin | ............... | G06F 17/30067 707/781 |
| 2006/0059455 A1* | 3/2006 | Roth | ........................ | G06F 8/70 717/103 |
| 2007/0220479 A1* | 9/2007 | Hughes | ...................... | G06F 8/00 717/100 |
| 2008/0120598 A1* | 5/2008 | Imeshev | ................... | G06F 8/71 717/120 |
| 2013/0159365 A1* | 6/2013 | Boctor | ...................... | G06F 8/71 707/827 |

(Continued)

OTHER PUBLICATIONS

"Software versioning," from Wikipedia, the free encyclopedia, accessed Mar. 9, 2016 from http://en.wikipedia.org/wiki/Software_versioning, 14 pages.

*Primary Examiner* — Jae Jeon
*Assistant Examiner* — Douglas Slachta
(74) *Attorney, Agent, or Firm* — Banner & Witcoff, Ltd.; Michael A. Spring

(57) ABSTRACT

A computing system may interface with different software versioning (SVN) systems via distinct interfaces. The computing system may receive, via one of the interfaces, and from a development platform of one of the SVN systems, a request to transmit draft code to a production platform of the SVN system. The computing system may identify, based on the SVN system, a set of requirements for the draft code from amongst requirement sets stored in memory. Responsive to determining that the draft code conforms to the requirements, the computing system may transmit the draft code to the production platform via the interface.

16 Claims, 17 Drawing Sheets

(56) References Cited

U.S. PATENT DOCUMENTS

| | | |
|---|---|---|
| 2013/0167241 A1* | 6/2013 | Siman .................... G06F 8/433 726/25 |
| 2014/0082595 A1* | 3/2014 | Van Gogh ........... G06F 11/3604 717/126 |
| 2014/0282400 A1* | 9/2014 | Moorthi .................... G06F 8/71 717/122 |
| 2015/0205600 A1* | 7/2015 | Grillo ....................... G06F 8/70 717/101 |
| 2015/0220332 A1* | 8/2015 | Bernstein ................. G06F 8/71 717/121 |
| 2015/0261419 A1 | 9/2015 | Flowers |
| 2015/0262093 A1 | 9/2015 | Lee et al. |
| 2015/0262105 A1 | 9/2015 | Jeffries et al. |
| 2015/0264373 A1 | 9/2015 | Wang et al. |
| 2015/0264484 A1 | 9/2015 | Peters et al. |
| 2015/0269383 A1 | 9/2015 | Lang et al. |
| 2015/0269617 A1 | 9/2015 | Mikurak |
| 2015/0278894 A1 | 10/2015 | Reeder et al. |
| 2015/0294250 A1 | 10/2015 | Anerousis et al. |
| 2015/0302893 A1 | 10/2015 | Shannon |
| 2015/0310751 A1 | 10/2015 | Tolia |
| 2015/0312344 A1 | 10/2015 | Anderton et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0331554 A1 | 11/2015 | Li |
| 2015/0331913 A1 | 11/2015 | Borowiec et al. |
| 2015/0339020 A1 | 11/2015 | D'Amore et al. |
| 2015/0339285 A1 | 11/2015 | Safaei et al. |
| 2015/0339629 A1 | 11/2015 | D'Amore et al. |
| 2015/0339787 A1 | 11/2015 | Evans |
| 2015/0341300 A1 | 11/2015 | Swain et al. |
| 2015/0341736 A1 | 11/2015 | Peters et al. |
| 2015/0347432 A1 | 12/2015 | Tsai et al. |
| 2015/0347542 A1 | 12/2015 | Sullivan et al. |
| 2015/0347578 A1 | 12/2015 | Tsai et al. |
| 2015/0347593 A1 | 12/2015 | Tsai et al. |
| 2015/0347971 A1 | 12/2015 | D'Amore et al. |
| 2015/0350077 A1 | 12/2015 | Durrani et al. |
| 2015/0350737 A1 | 12/2015 | Anderson et al. |
| 2015/0356060 A1 | 12/2015 | Peden |
| 2015/0356649 A1 | 12/2015 | Glass et al. |
| 2015/0363295 A1 | 12/2015 | Gopalakrishnan et al. |
| 2015/0363899 A1 | 12/2015 | Krause et al. |
| 2015/0373333 A1 | 12/2015 | Wang et al. |
| 2015/0373344 A1 | 12/2015 | Wang et al. |
| 2015/0373345 A1 | 12/2015 | Ramasubramonian et al. |
| 2015/0373348 A1 | 12/2015 | Wang et al. |
| 2015/0373357 A1 | 12/2015 | Pang et al. |
| 2015/0373358 A1 | 12/2015 | Pang et al. |
| 2015/0373374 A1 | 12/2015 | Ramasubramonian et al. |
| 2015/0382076 A1 | 12/2015 | Davisson et al. |
| 2016/0012129 A1 | 1/2016 | Rampson et al. |
| 2016/0012556 A1 | 1/2016 | Moore et al. |
| 2016/0012821 A1 | 1/2016 | Goldberg |
| 2016/0028776 A1 | 1/2016 | Lim |
| 2016/0048516 A1 | 2/2016 | Guiliano et al. |
| 2016/0063114 A1 | 3/2016 | Marino et al. |
| 2016/0063575 A1 | 3/2016 | Marino et al. |

* cited by examiner

SVN INTERFACE SYSTEM FOR HETEROGENEOUS DEVELOPMENT ENVIRONMENTS

BACKGROUND

Software versioning (SVN) systems allow developers to organize and manage code associated with applications under development, for example, by assigning unique identifiers to different versions of code throughout the development lifecycle. Many modern computing environments include applications supported by multiple different computing platforms. The requirements of such applications may constantly evolve, necessitating frequent changes to the underlying code, and the platforms may utilize different SVN systems to organize and manage their respective code. The use of multiple SVN systems presents challenges, for example, in maintaining overall integrity of applications (e.g., potential quality, attribution, and security concerns, or the like). Accordingly, there is a need for an SVN interface system for heterogeneous development environments.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

In accordance with embodiments of the disclosure, a computing system may interface with different software versioning (SVN) systems via distinct interfaces. The computing system may receive, via one of the interfaces, and from a development platform of one of the SVN systems, a request to transmit draft code to a production platform of the SVN system. The computing system may identify, based on the SVN system, a set of requirements for the draft code from amongst requirement sets stored in memory. Responsive to determining that the draft code conforms to the requirements, the computing system may transmit the draft code to the production platform via the interface.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. Other embodiments may be utilized and structural and functional modifications may be made, without departing from the scope of the disclosure.

Various connections between elements are discussed in the following description. These connections are general and, unless specified otherwise, may be direct or indirect, wired or wireless. In this respect, the specification is not intended to be limiting.

Figure 1:
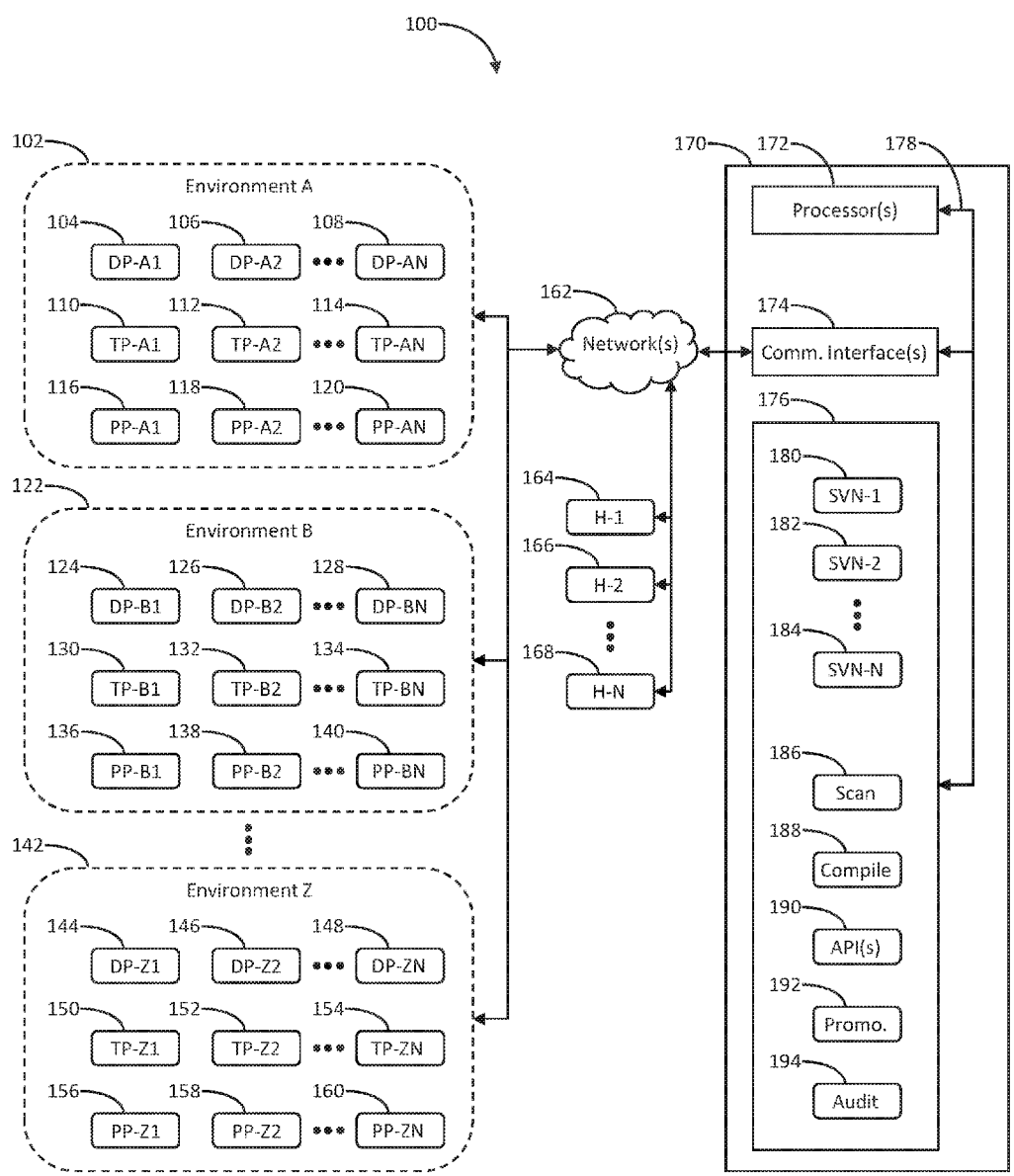
FIG. 1 depicts an illustrative environment in accordance with one or more aspects of the disclosure.

FIG. 1 depicts an illustrative environment in accordance with one or more aspects of the disclosure. Referring to FIG. 1, environment 100 may include environments 102, 122, and 142. For example, environments 102, 122, and 142 may be distinct software development environments associated with different entities (e.g., applications, teams, organizations, groups within a common organization, or the like). Each of environments 102, 122, and 142 may include one or more computing platforms. For example, environment 102 may include platforms 104, 106, 108, 110, 112, 114, 116, 118, and 120. Similarly, environment 122 may include platforms 124, 126, 128, 130, 132, 134, 136, 138, and 140; and environment 142 may include platforms 144, 146, 148, 150, 152, 154, 156, 158, and 160.

Environment 100 may also include one or more networks 162 (e.g., local area networks (LANs), wide area networks (WANs), virtual private networks (VPNs), or combinations thereof), network hosts 164, 166, and 168, and SVN interface system 170. Each of platforms 104, 106, 108, 110, 112, 114, 116, 118, 120, 124, 126, 128, 130, 132, 134, 136, 138, 140, 144, 146, 148, 150, 152, 154, 156, 158, and 160 and hosts 164, 166, and 168 may include one or more computing devices (e.g., servers, desktop computers, laptop computers, tablet computers, mobile devices, smartphones, or the like). Networks 162 may interface one or more of environments 102, 122, or 142 (or one or more computing devices therein), hosts 164, 166, or 168, and system 170.

System 170 may comprise one or more processors 172, communication interfaces 174, memory 176, and data bus 178. Data bus 178 may interface processors 172, communication interfaces 174, and memory 176. Communication interfaces 174 may interface (e.g., via networks 162) system 170 with one or more of environments 102, 122, or 142 (or one or more computing devices therein) or hosts 164, 166, or 168. In some embodiments, system 170 may comprise one or more of environments 102, 122, or 142 (or one or more computing devices therein) or hosts 164, 166, or 168. Memory 176 may comprise modules 180, 182, 184, 186, 188, 190, 192, and 194, which may comprise instructions that when executed by processors 172 cause system 170 to perform one or more of the functions described herein.

System 170 may be configured to interface with multiple distinct SVN systems of environment 100. For example, module 180 may comprise an interface to an associated SVN system comprising one or more computing devices of platforms 104, 124, and 144 (e.g., development platforms), platforms 110, 130, and 150 (e.g., test platforms), and platforms 116, 136, and 156 (e.g., production (or live) platforms). Similarly, module 182 may comprise an interface to an associated SVN system comprising one or more computing devices of platforms 106, 126, and 146 (e.g., development platforms), platforms 112, 132, and 152 (e.g., test platforms), and platforms 118, 138, and 158 (e.g., production (or live) platforms); and module 184 may comprise an interface to an SVN system comprising one or more computing devices of platforms 108, 128, and 148 (e.g., development platforms), platforms 114, 134, and 154 (e.g., test platforms), and platforms 120, 140, and 160 (e.g., production (or live) platforms).

Figure 2A:
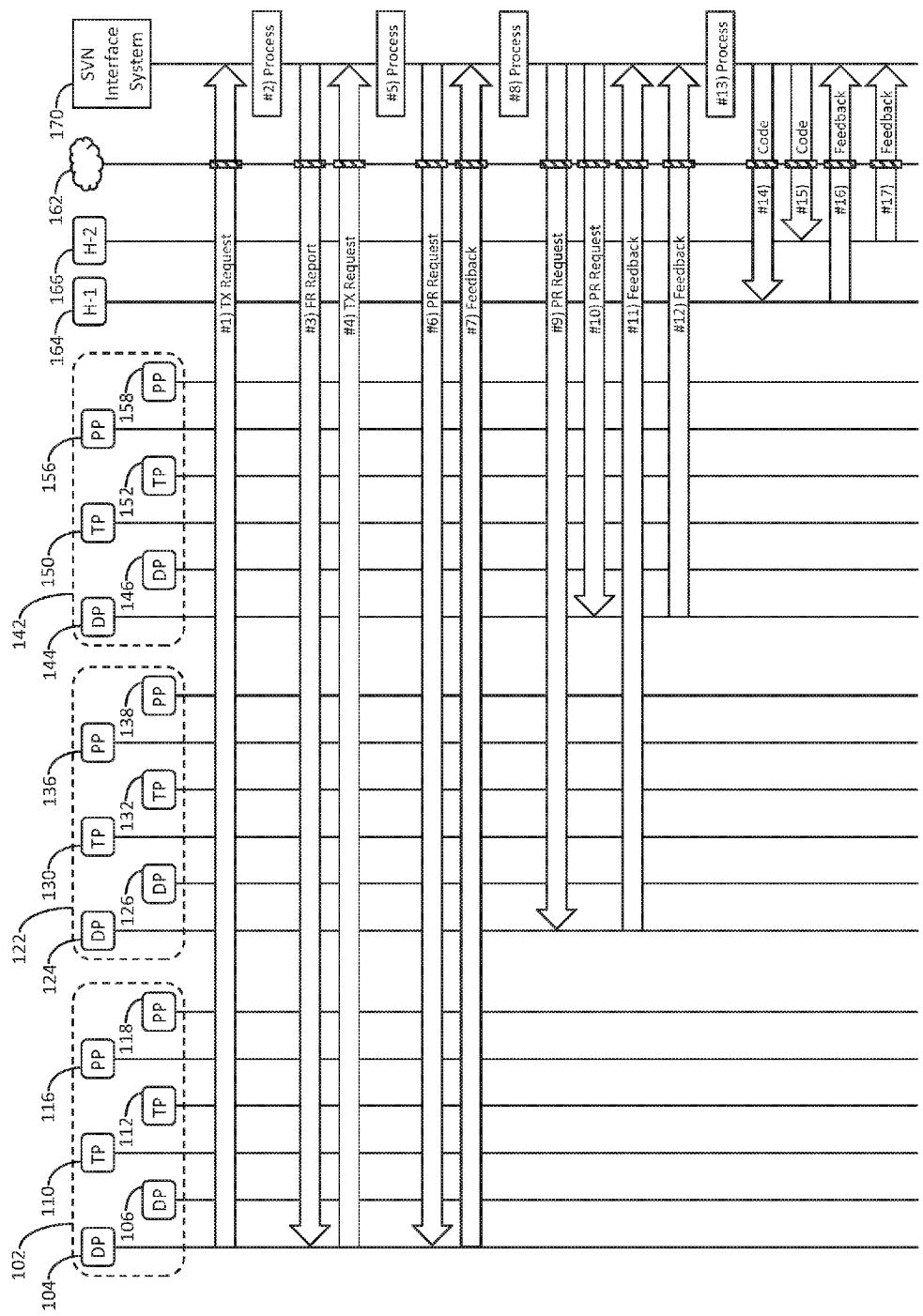
FIGS. 2A-N depict illustrative event sequences in accordance with one or more aspects of the disclosure.
Figure 2B:
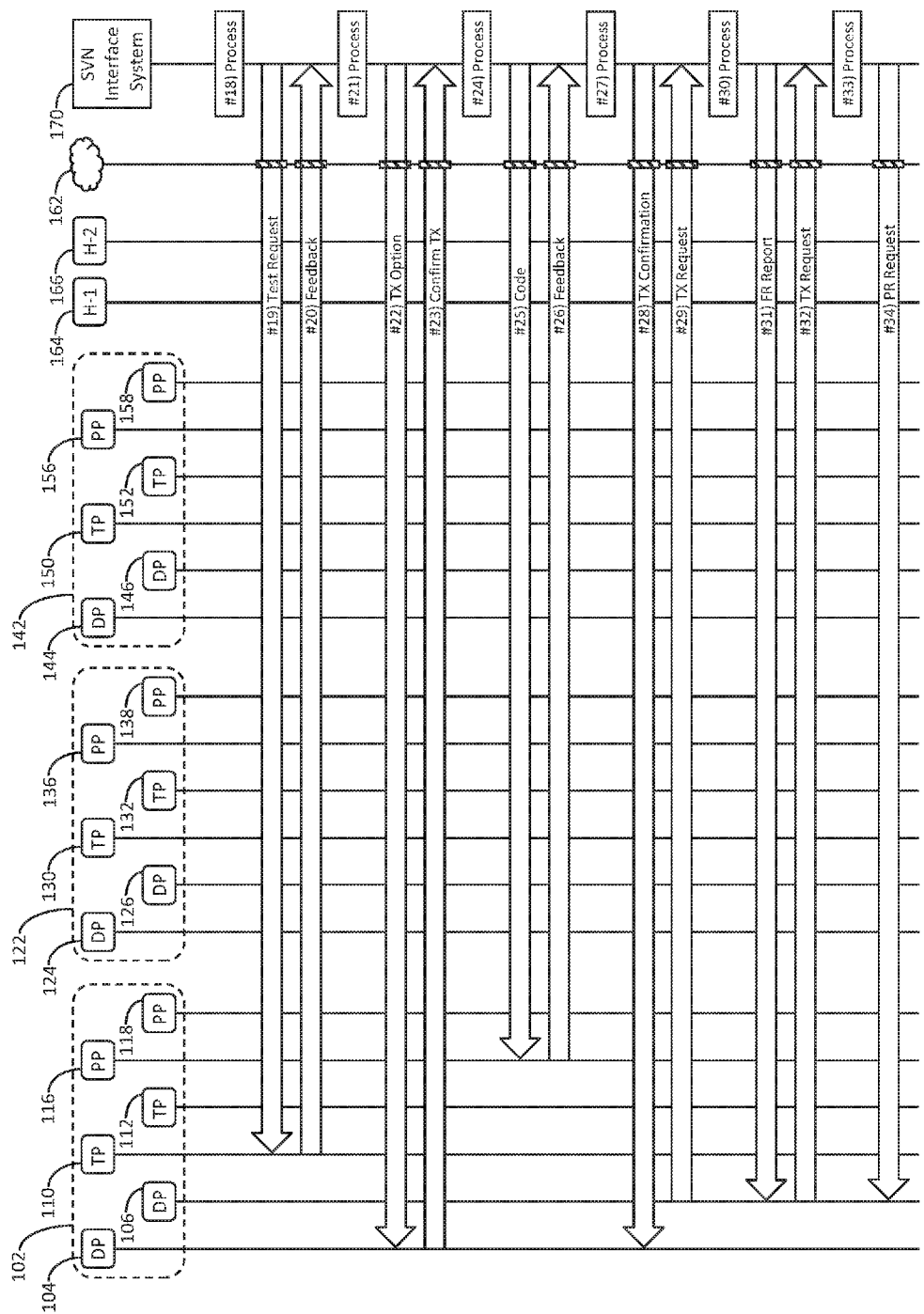
Figure 2C:
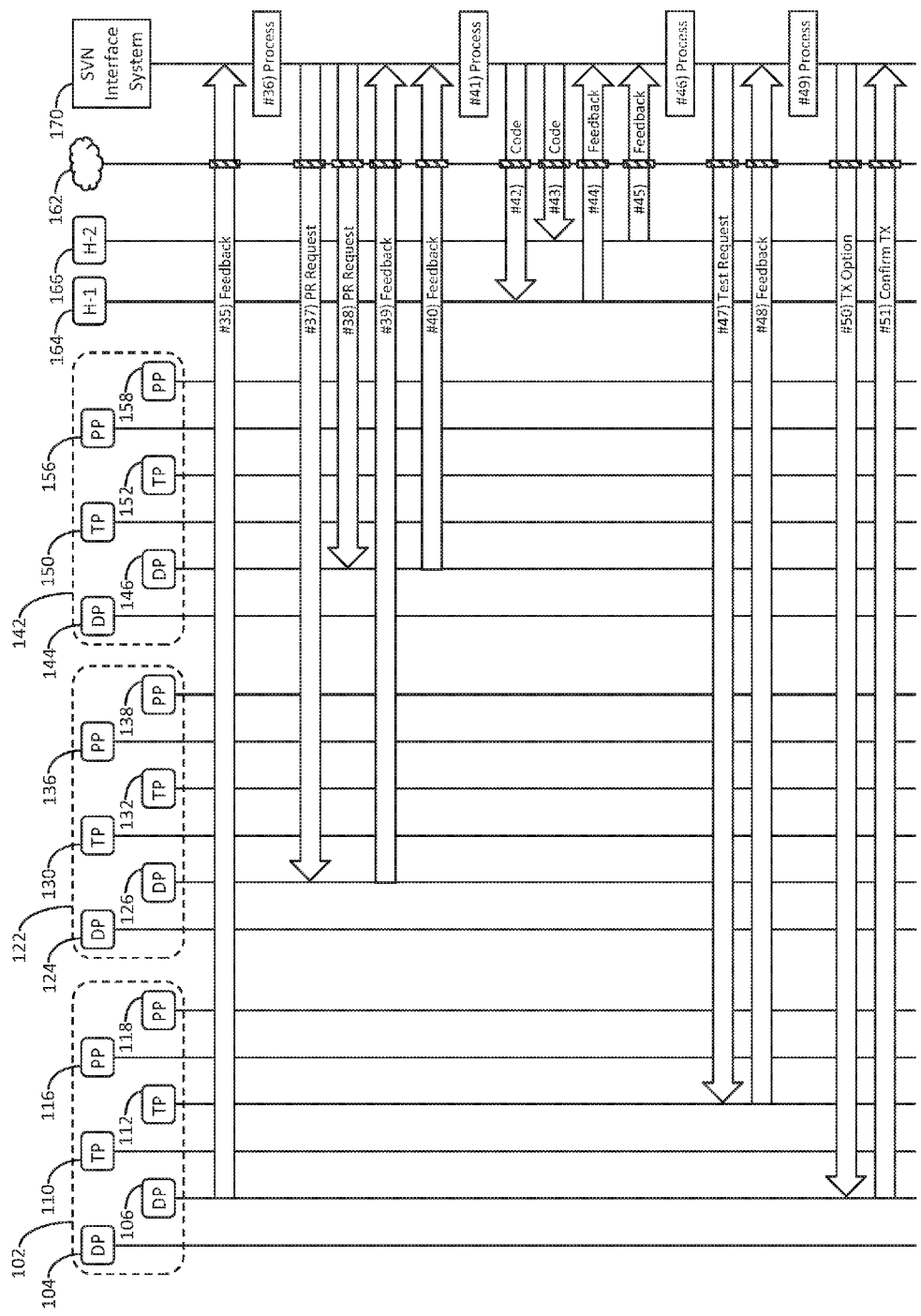
Figure 2D:
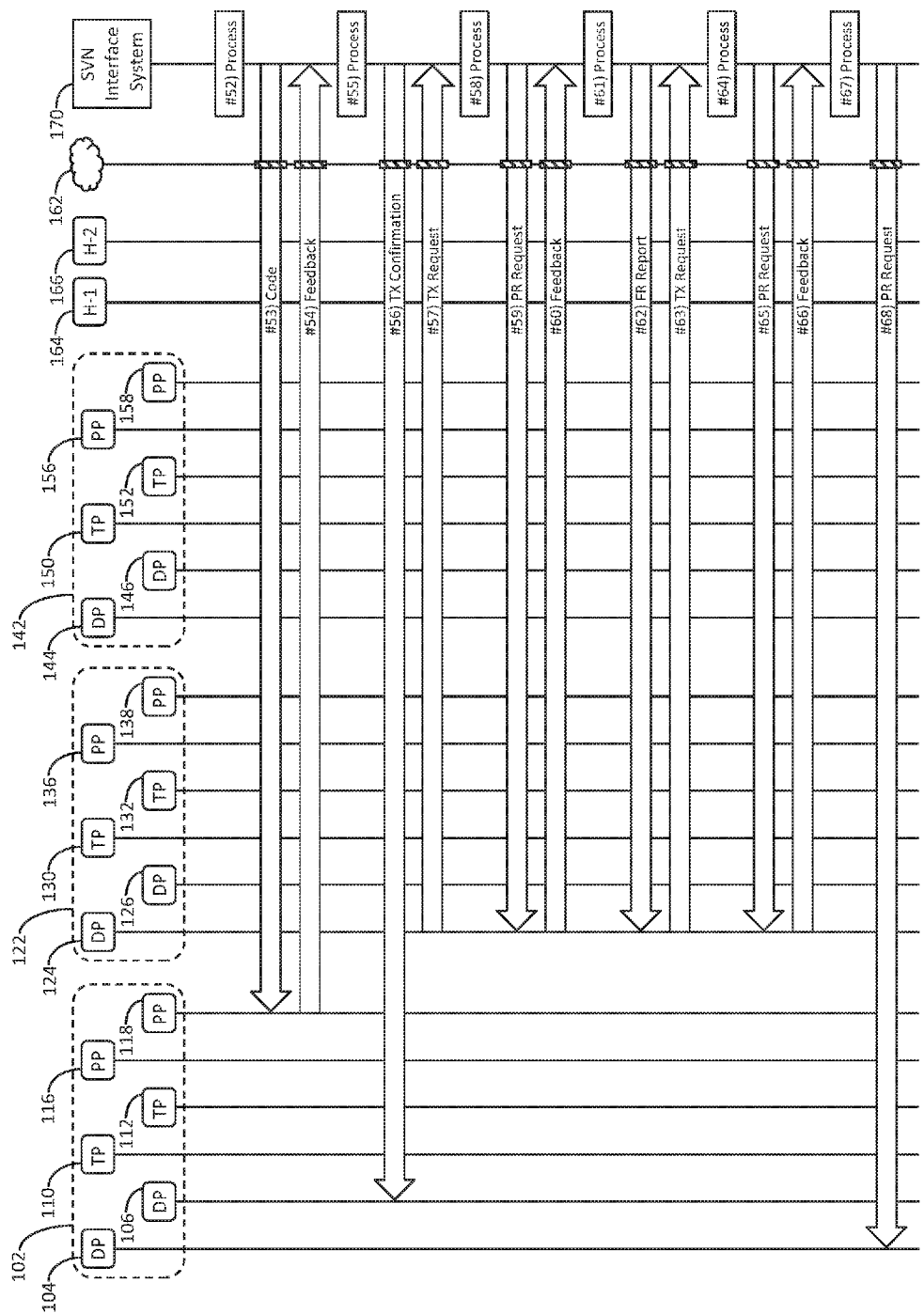
Figure 2E:
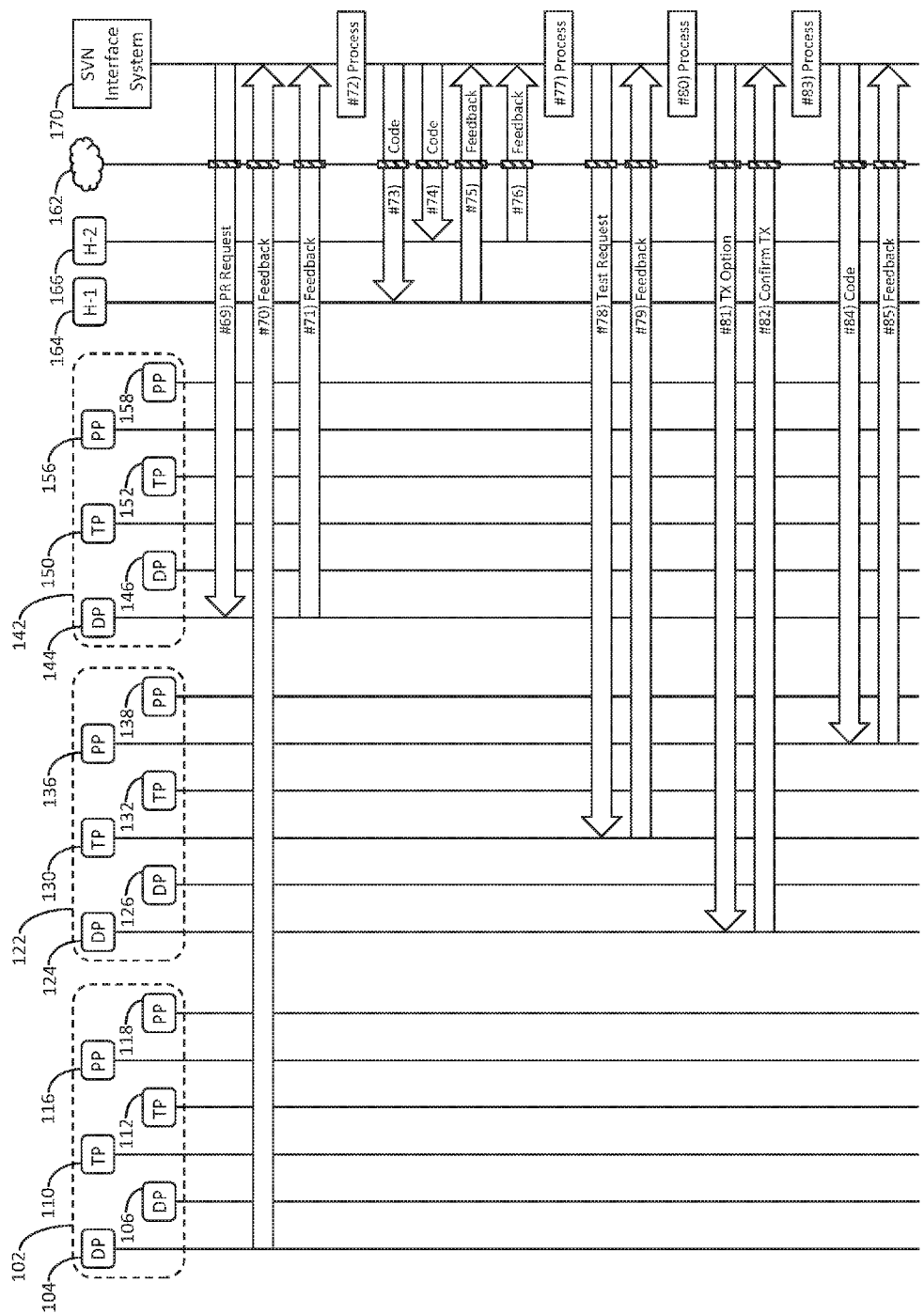
Figure 2F:
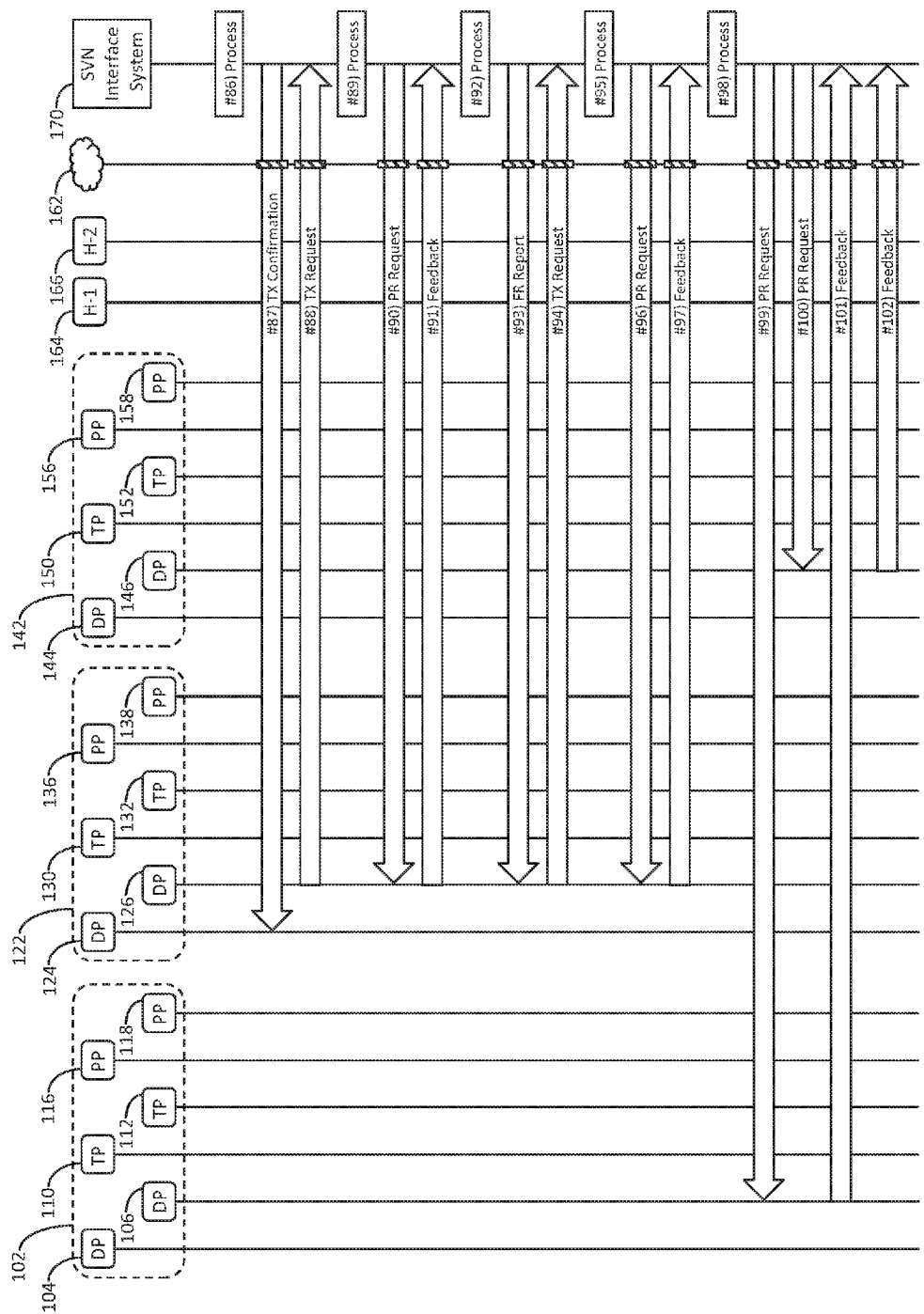
Figure 2G:
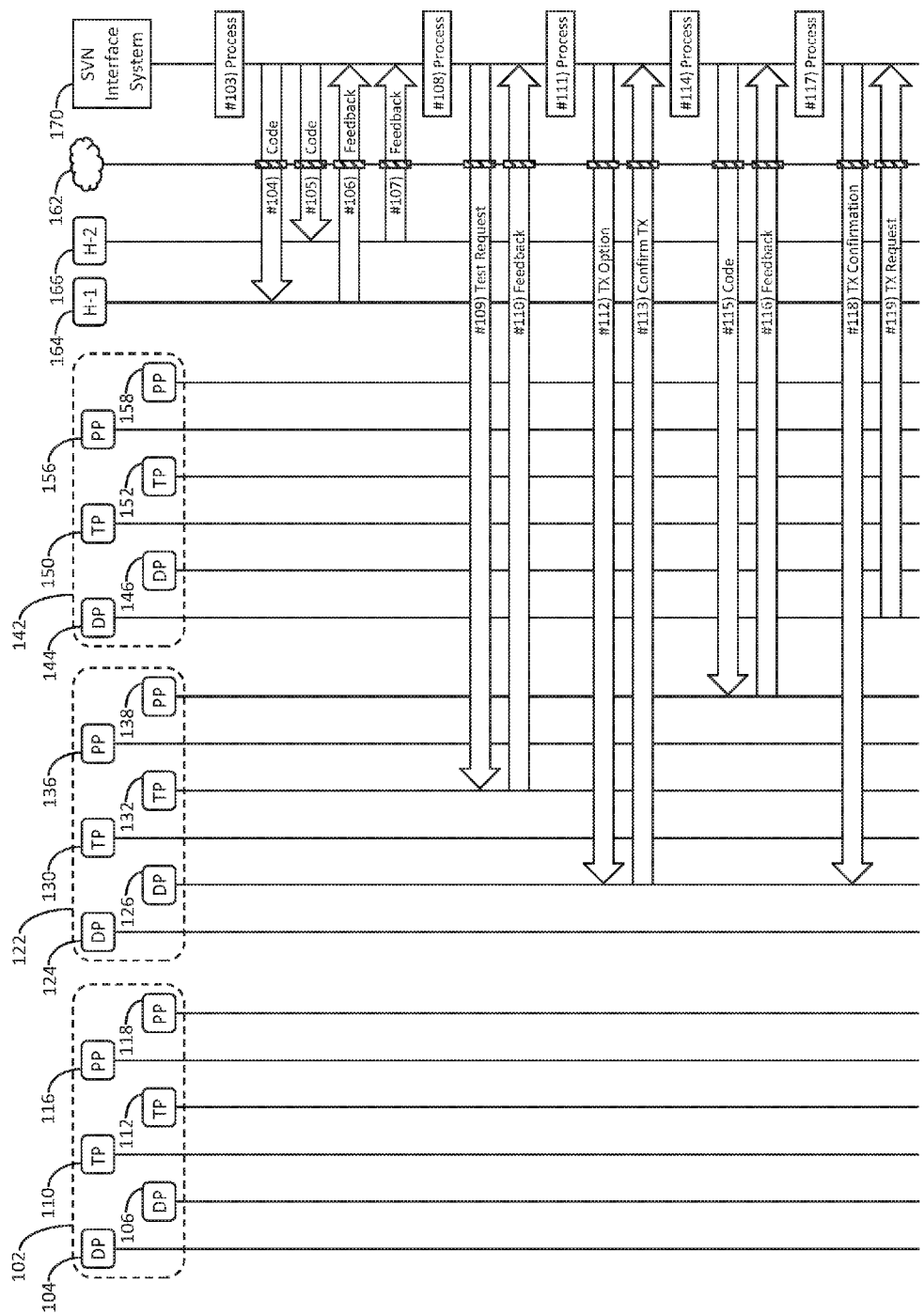
Figure 2H:
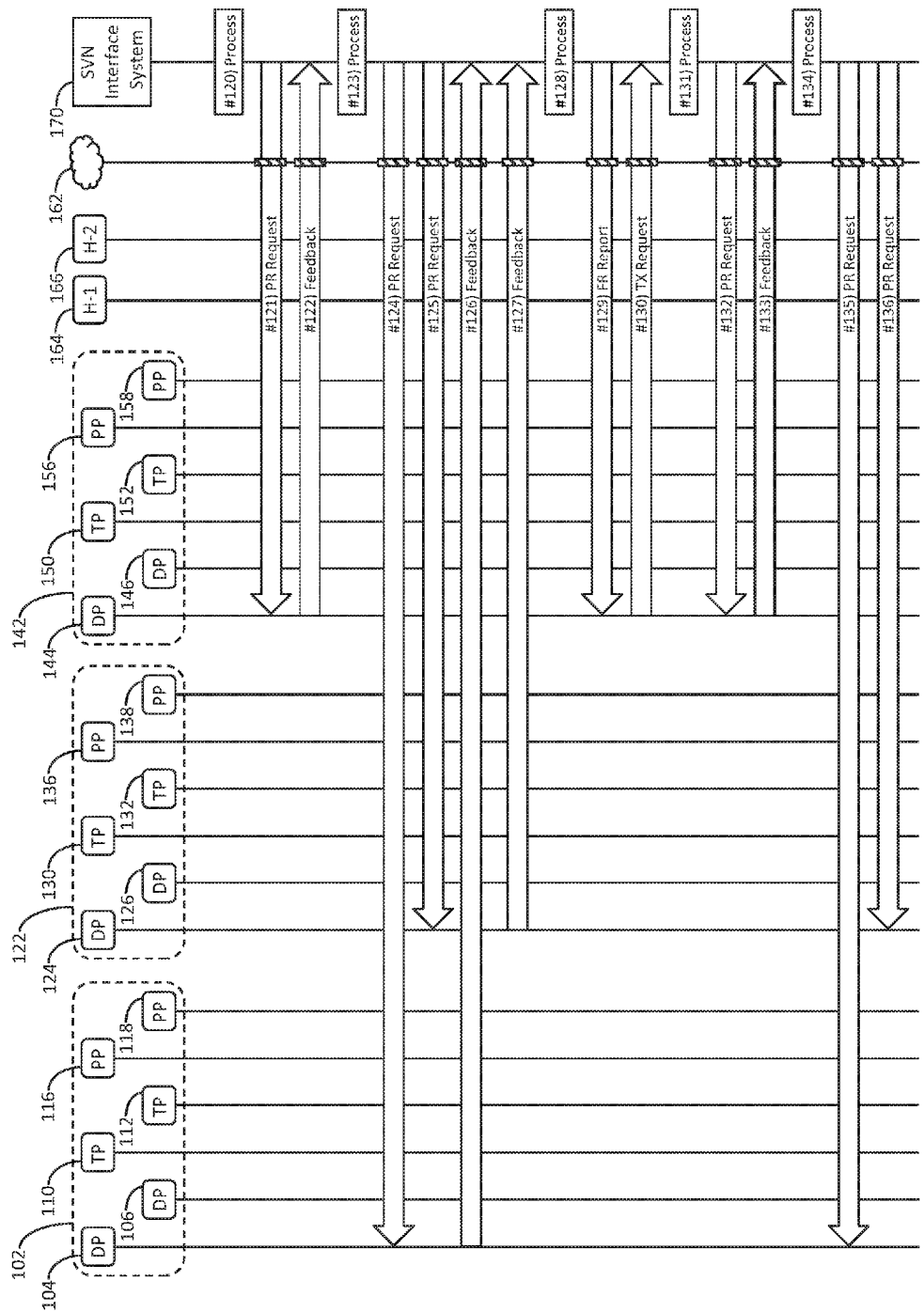
Figure 2I:
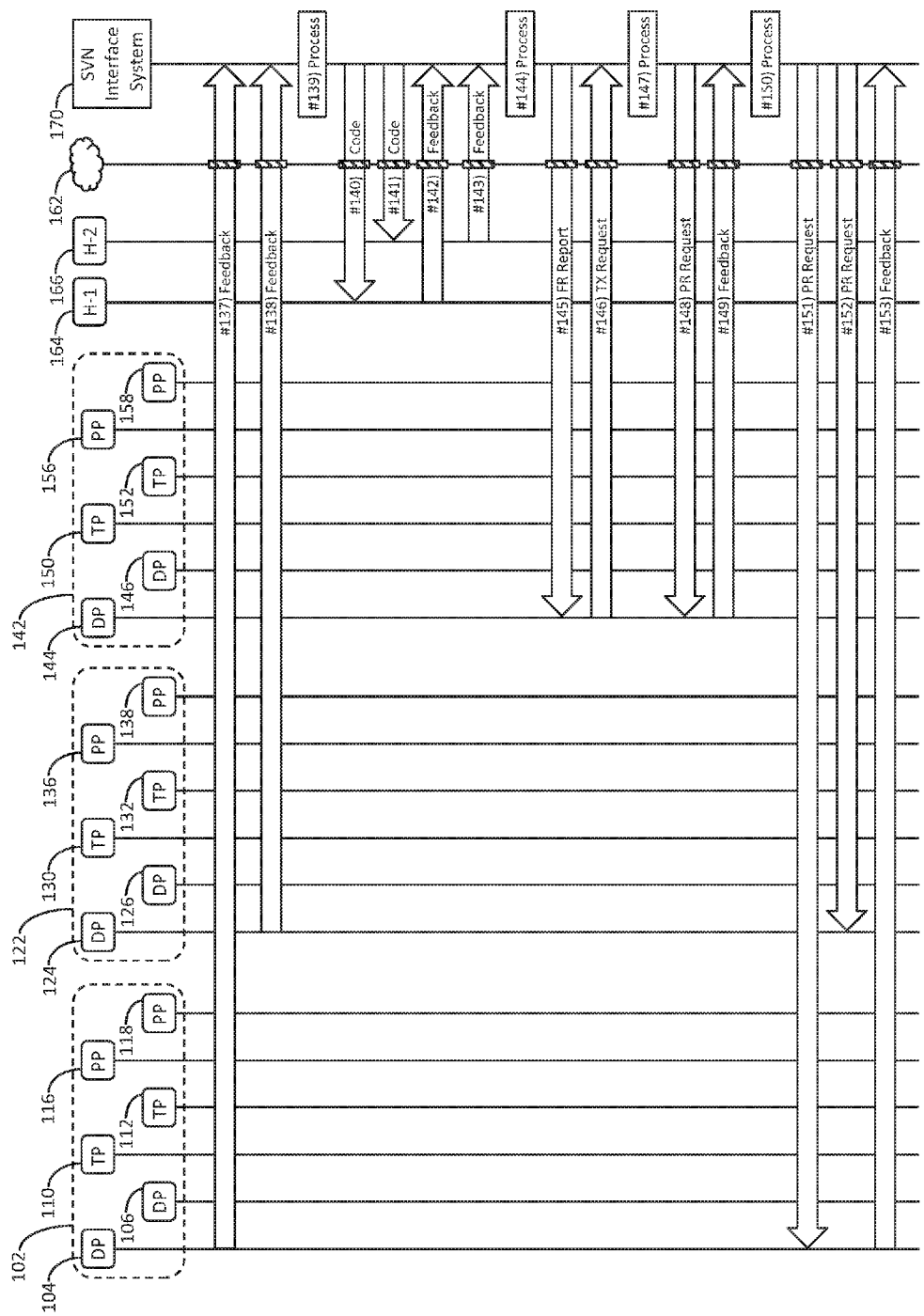
Figure 2J:
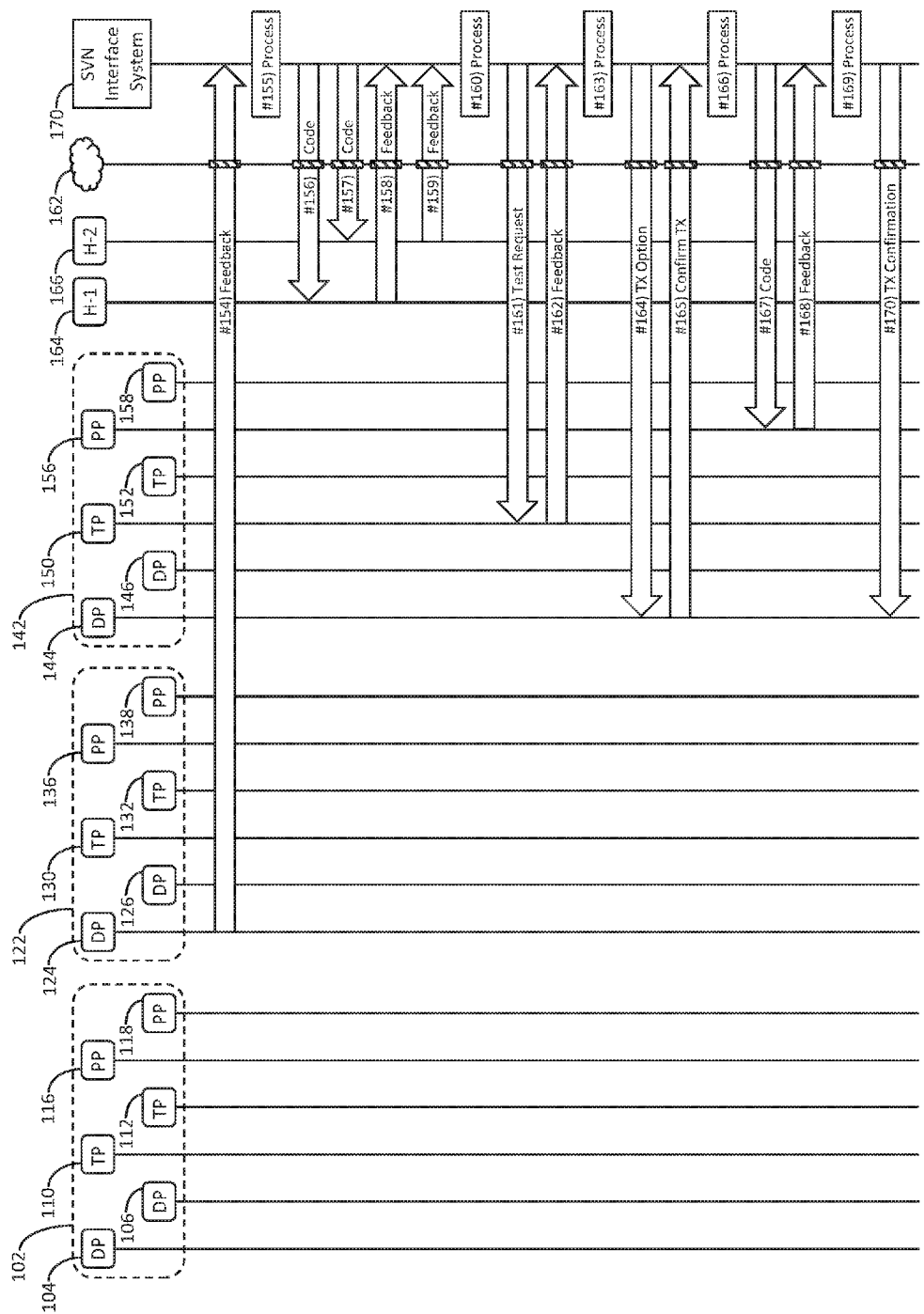
Figure 2K:
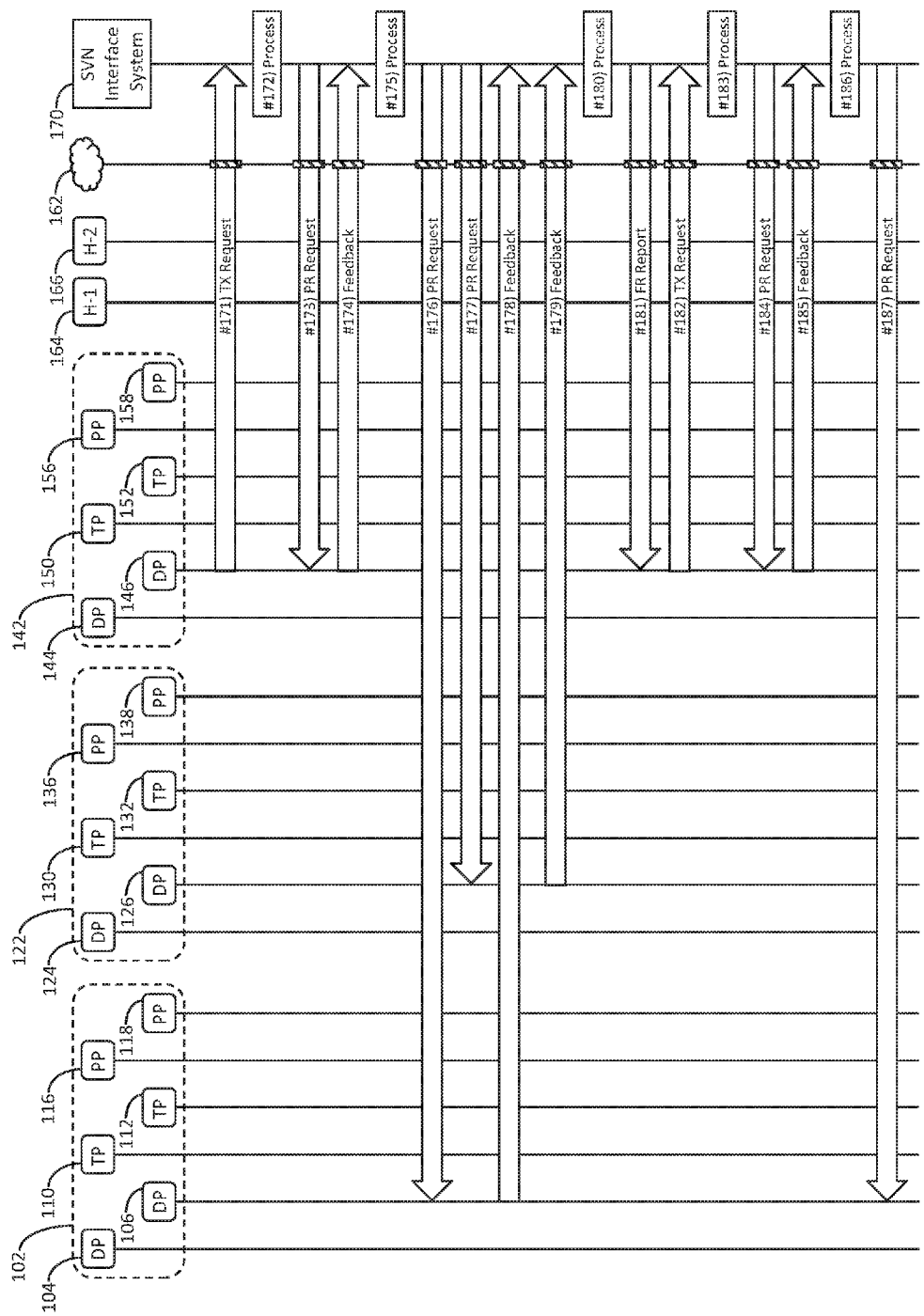
Figure 2L:
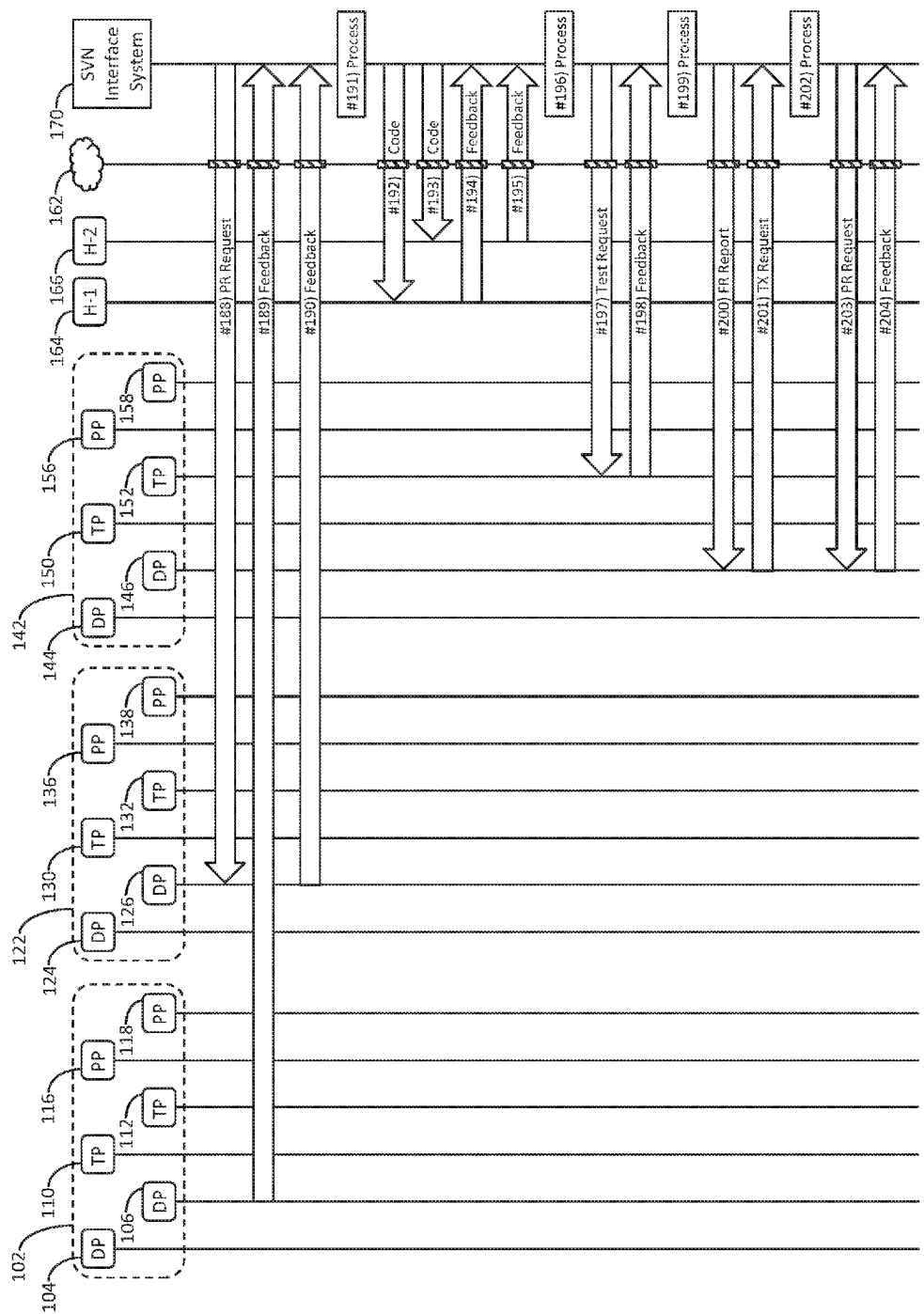
Figure 2M:
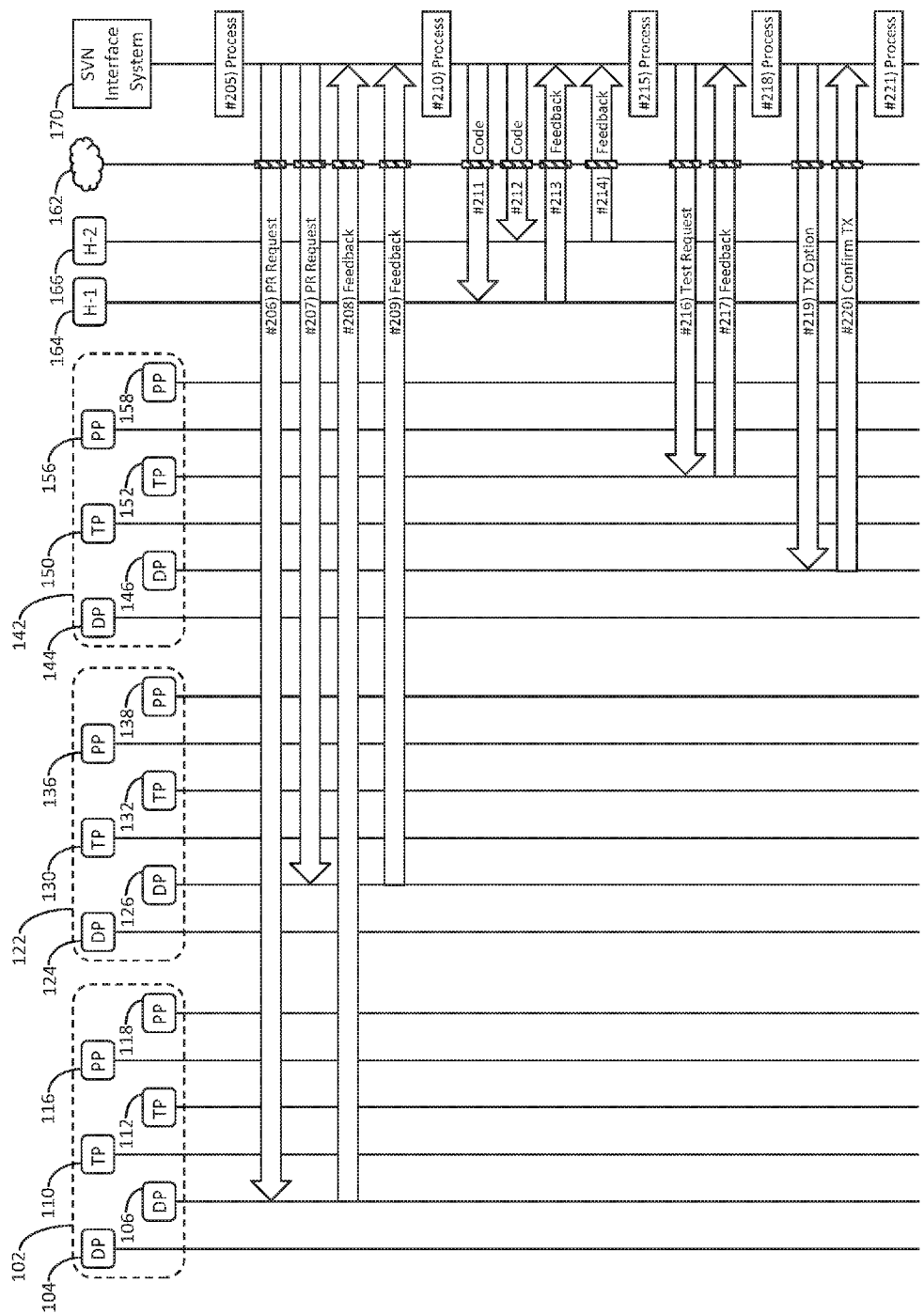
Figure 2N:
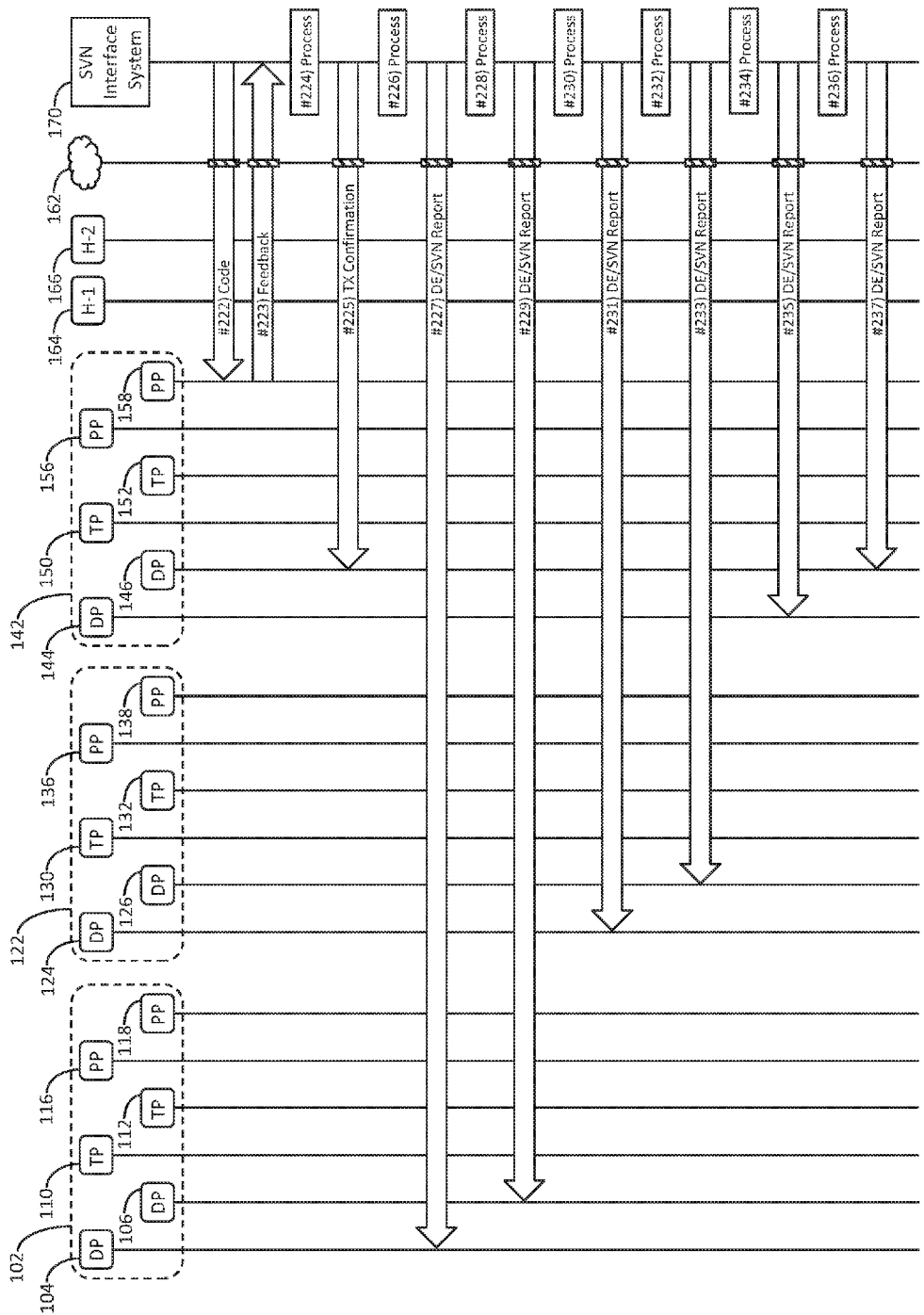

FIGS. 2A-N depict illustrative event sequences in accordance with one or more aspects of the disclosure. The depicted steps are merely illustrative and may be omitted, combined, or performed in an order other than that depicted; the numbering of the steps is merely for ease of reference and does not imply any particular ordering is necessary or preferred.

Referring to FIG. 2A, at step #1, system 170 may receive, from a computing device of platform 104 (e.g., via the interface of module 180; communication interfaces 174; and networks 162, as depicted by the crosshatched box over the line extending downward from networks 162), a request to transmit draft code (e.g., source code) to platform 116. Memory 176 may store a requirement set for the SVN system associated with module 180, a requirement set for the SVN system associated with module 182, and a requirement set for the SVN system associated with module 184, and system 170 may identify (e.g., based on the request being received via the interface of module 180) the requirement set for the SVN system associated with module 180.

At step #2, responsive to system 170 identifying the requirement set for the SVN system associated with module 180, module 194 may cause system 170 to store data in memory 176 indicating receipt of the request from the computing device of platform 104, and module 192 may cause system 170 to determine whether the draft code conforms to one or more requirements in the requirement set for the SVN system associated with module 180.

In some embodiments, the requirement(s) may comprise a syntax requirement. In such embodiments, module 186 may cause system 170 to determine (e.g., by parsing the draft code) a structure of the draft code and to compare the structure to the syntax requirement. Additionally or alternatively, module 186 may cause system 170 to determine whether the draft code comprises a potential vulnerability subject to a condition (e.g., a "sleeping" security concern) and if so, whether the potential vulnerability and/or the condition conform to the requirement(s). In some embodiments, module 188 may cause system 170 to compile the draft code to generate executable code. In such embodiments, module 186 may cause system 170 to determine whether a structure of the executable code conforms to the requirement(s).

Responsive to a determination by system 170 (e.g., via modules 186 and/or 188) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #3, system 170 may transmit, to the computing device of platform 104 (e.g., via the interface of module 180), the data indicating the portion of the draft code that fails to conform to the requirement(s) and/or the requirement(s) with which the portion of the draft code fails to conform.

At step #4, system 170 may receive, from the computing device of platform 104 (e.g., via the interface of module 180), a request to transmit draft code to platform 116, and system 170 may identify (e.g., based on the request being received via the interface of module 180) the requirement set for the SVN system associated with module 180.

At step #5, responsive to system 170 identifying the requirement set for the SVN system associated with module 180, module 194 may cause system 170 to store data in memory 176 indicating receipt of the request from the computing device of platform 104, and module 192 may cause system 170 to determine whether the draft code conforms to one or more requirements in the requirement set for the SVN system associated with module 180.

The draft code may comprise code system 170 previously determined failed to conform to the requirement(s), and system 170 may determine (e.g., via modules 186 and/or 188) that the draft code conforms to the requirement(s). For example, the draft code may comprise code from the draft code the computing device of platform 104 requested be transmitted to platform 116 at step #1 revised to conform to the requirement(s) (e.g., based on the data transmitted to the computing device of platform 104 at step #3).

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by a peer developer of environment 102, system 170 may generate a peer-review request comprising and/or identifying the draft code, and system 170 may (e.g., via the interface of module 180), at step #6, transmit the peer-review request to a computing device of platform 104 associated with a peer developer of environment 102 (e.g., a computing device of platform 104 different from the computing device from which the request to transmit the draft code to platform 116 was received at step #4); and, at step #7, receive data from platform 104 indicating whether the peer developer of environment 102 determined the draft code conforms to the requirement(s).

At step #8, responsive to a determination by system 170 (e.g., based on the data received from platform 104) that the peer developer of environment 102 determined the draft code conforms to the requirement(s), module 194 may cause system 170 to store data in memory 176 indicating the peer developer of environment 102 determined the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by peer developers of environments 122 and 142, and system 170 may (e.g., via the interface of module 180), at step #9, transmit the peer-review request to platform 124; at step #10, transmit the peer-review request to platform 144; at step #11, receive data from platform 124 indicating whether a peer developer of environment 122 determined the draft code conforms to the requirement(s); and, at step #12, receive data from platform 144 indicating whether a peer developer of environment 142 determined the draft code conforms to the requirement(s).

At step #13, responsive to a determination by system 170 (e.g., based on the data received from platforms 124 and 144) that the peer developers of environments 122 and 142 determined the draft code conforms to the requirement(s), module 194 may cause system 170 to store data in memory 176 indicating the peer developers of environments 122 and 142 determined the draft code conforms to the requirement(s), and module 192 may cause system 170 to determine whether the draft code conforms to one or more requirements in the requirement set for the SVN system associated with module 180.

The requirement(s) may require the draft code be verified by one or more vulnerability-identification services associated with hosts 164 and 166, module 190 may comprise one or more application program interfaces (APIs) of the vulnerability-identification service(s), and system 170 may (e.g., via the API(s) of module 190), at step #14, transmit the draft code to host 164; at step #15, transmit the draft code to host 166; at step #16, receive data from host 164 indicating whether the vulnerability-identification service(s) verified the draft code; and, at step #17, receive data from host 166 indicating whether the vulnerability-identification service(s) verified the draft code.

Referring to FIG. 2B, at step #18, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 180.

The requirement(s) may require the draft code be executed by a test platform of environment 102 that executes code corresponding to code executed by platform 116, platform 110 may execute code corresponding to code executed by platform 116, and system 170 may (e.g., via the interface of module 180), at step #19, transmit a request configured to cause platform 110 to execute the draft code; and, at step #20, receive data generated by platform 110 executing the draft code and code corresponding to code executed by platform 116.

System 170 may determine (e.g., based on the data generated by platform 110) that the draft code conforms to the requirement(s). For example, the data generated by test platform 110 may indicate one or more execution flows from the draft code into the code corresponding to the code executed by platform 116 and/or from the code corresponding to the code executed by platform 116 into the draft code, and system 170 may determine (e.g., based on the execution flows) that the draft code comprises one of a potential vulnerability subject to a condition or the condition, that the code corresponding to the code executed by platform 116 comprises the other of the potential vulnerability subject to the condition or the condition, and that the potential vulnerability subject to the condition and/or the condition conforms to the requirement(s).

At step #21, responsive to a determination by system 170 (e.g., based on the data generated by platform 110) that the draft code conforms to each of the requirements in the requirement set for the SVN system associated with module 180, module 194 may cause system 170 to store data in memory 176 indicating the draft code conforms to each of the requirements in the requirement set for the SVN system associated with module 180, and module 192 may cause system 170 to generate a report indicating the draft code conforms to each of the requirements in the requirement set for the SVN system associated with module 180.

The report may comprise an option to transmit the draft code to platform 116, and system 170 may (e.g., via the interface of module 180), at step #22, transmit the report to the computing device of platform 104; and, at step #23, receive data from the computing device of platform 104 indicating invocation of the option to transmit the draft code to platform 116.

At step #24, responsive to system 170 receiving the data from the computing device of platform 104 indicating invocation of the option to transmit the draft code to platform 116, module 194 may cause system 170 to store data in memory 176 indicating invocation of the option to transmit the draft code to platform 116, and system 170 may (e.g., via the interface of module 180), at step #25, transmit the draft code to platform 116; and, at step #26, receive data from platform 116 indicating receipt of the draft code.

At step #27, responsive to system 170 receiving the data from platform 116 indicating receipt of the draft code, module 194 may cause system 170 to store data in memory 176 indicating receipt of the draft code by platform 116, and, at step #28, system 170 may transmit, to the computing device of platform 104 (e.g., via the interface of module 180), data confirming transmission of the draft code to platform 116.

At step #29, system 170 may receive, from a computing device of platform 106 (e.g., via the interface of module 182), a request to transmit draft code to platform 118, and system 170 may identify (e.g., based on the request being received via the interface of module 182) the requirement set for the SVN system associated with module 182.

At step #30, responsive to system 170 identifying the requirement set for the SVN system associated with module 182, module 194 may cause system 170 to store data in memory 176 indicating receipt of the request from the computing device of platform 106, and module 192 may cause system 170 to determine whether the draft code conforms to one or more requirements in the requirement set for the SVN system associated with module 182.

Responsive to a determination by system 170 (e.g., via modules 186 and/or 188) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #31, system 170 may transmit, to the computing device of platform 106 (e.g., via the interface of module 182), the data indicating the portion of the draft code that fails to conform to the requirement(s) and/or the requirement(s) with which the portion of the draft code fails to conform.

At step #32, system 170 may receive, from the computing device of platform 106 (e.g., via the interface of module 182), a request to transmit draft code to platform 118, and system 170 may identify (e.g., based on the request being received via the interface of module 182) the requirement set for the SVN system associated with module 182.

At step #33, responsive to system 170 identifying the requirement set for the SVN system associated with module 182, module 194 may cause system 170 to store data in memory 176 indicating receipt of the request from the computing device of platform 106, and module 192 may cause system 170 to determine whether the draft code conforms to one or more requirements in the requirement set for the SVN system associated with module 182.

The draft code may comprise code system 170 previously determined failed to conform to the requirement(s), and system 170 may determine (e.g., via modules 186 and/or 188) that the draft code conforms to the requirement(s). For example, the draft code may comprise code from the draft code the computing device of platform 106 requested be transmitted to platform 118 at step #29 revised to conform to the requirement(s) (e.g., based on the data transmitted to the computing device of platform 106 at step #31).

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by a peer developer of environment 102, system 170 may generate a peer-review request comprising and/or identifying the draft code, and system 170 may (e.g., via the interface of module 182), at step #34, transmit the peer-review request to a computing device of platform 106 associated with a peer developer of environment 102 (e.g., a computing device of platform 106 different from the computing device from which the request to transmit the draft code to platform 118 was received at step #32); and, referring to FIG. 2C, at step #35, receive data from platform 106 indicating whether the peer developer of environment 102 determined the draft code conforms to the requirement(s).

At step #36, responsive to a determination by system 170 (e.g., based on the data received from platform 106) that the peer developer of environment 102 determined the draft code conforms to the requirement(s), module 194 may cause system 170 to store data in memory 176 indicating the peer developer of environment 102 determined the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by peer developers of environments 122 and 142, and system 170 may (e.g., via the interface of module 182), at step #37, transmit the peer-review request to platform 126; at step #38, transmit the peer-review request to platform 146; at step #39, receive data from platform 126 indicating whether a peer developer of environment 122 determined the draft code conforms to the requirement(s); and, at step #40, receive data from platform 146 indicating whether a peer developer of environment 142 determined the draft code conforms to the requirement(s).

At step #41, responsive to a determination by system 170 (e.g., based on the data received from platforms 126 and 146) that the peer developers of environments 122 and 142 determined the draft code conforms to the requirement(s), module 194 may cause system 170 to store data in memory 176 indicating the peer developers of environments 122 and 142 determined the draft code conforms to the requirement(s), and module 192 may cause system 170 to determine whether the draft code conforms to one or more requirements in the requirement set for the SVN system associated with module 182.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #42, transmit the draft code to host 164; at step #43, transmit the draft code to host 166; at step #44, receive data from host 164 indicating whether the vulnerability-identification service(s) verified the draft code; and, at step #45, receive data from host 166 indicating whether the vulnerability-identification service(s) verified the draft code.

At step #46, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 182.

The requirement(s) may require the draft code be executed by a test platform of environment 102 that executes code corresponding to code executed by platform 118, platform 112 may execute code corresponding to code executed by platform 118, and system 170 may (e.g., via the interface of module 182), at step #47, transmit a request configured to cause platform 112 to execute the draft code; and, at step #48, receive data generated by platform 112 executing the draft code and code corresponding to code executed by platform 118.

At step #49, responsive to a determination by system 170 (e.g., based on the data generated by platform 112) that the draft code conforms to each of the requirements in the requirement set for the SVN system associated with module 182, module 194 may cause system 170 to store data in memory 176 indicating the draft code conforms to each of the requirements in the requirement set for the SVN system associated with module 182, and module 192 may cause system 170 to generate a report indicating the draft code conforms to each of the requirements in the requirement set for the SVN system associated with module 182.

The report may comprise an option to transmit the draft code to platform 118, and system 170 may (e.g., via the interface of module 182), at step #50, transmit the report to the computing device of platform 106; and, at step #51, receive data from the computing device of platform 106 indicating invocation of the option to transmit the draft code to platform 118.

Referring to FIG. 2D, at step #52, responsive to system 170 receiving the data from the computing device of platform 106 indicating invocation of the option to transmit the draft code to platform 118, module 194 may cause system 170 to store data in memory 176 indicating invocation of the option to transmit the draft code to platform 118, and system 170 may (e.g., via the interface of module 182), at step #53, transmit the draft code to platform 118; and, at step #54, receive data from platform 118 indicating receipt of the draft code.

At step #55, responsive to system 170 receiving the data from platform 118 indicating receipt of the draft code, module 194 may cause system 170 to store data in memory 176 indicating receipt of the draft code by platform 118, and, at step #56, system 170 may transmit, to the computing device of platform 106 (e.g., via the interface of module 182), data confirming transmission of the draft code to platform 118.

At step #57, system 170 may receive, from a computing device of platform 124 (e.g., via the interface of module 180), a request to transmit draft code to platform 136, and system 170 may identify (e.g., based on the request being received via the interface of module 180) the requirement set for the SVN system associated with module 180.

At step #58, responsive to system 170 identifying the requirement set for the SVN system associated with module 180, module 194 may cause system 170 to store data in memory 176 indicating receipt of the request from the computing device of platform 124, and module 192 may cause system 170 to determine whether the draft code conforms to one or more requirements in the requirement set for the SVN system associated with module 180.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by a peer developer of environment 122, system 170 may generate a peer-review request comprising and/or identifying the draft code, and system 170 may (e.g., via the interface of module 180), at step #59, transmit the peer-review request to a computing device of platform 124 associated with a peer developer of environment 122 (e.g., a computing device of platform 124 different from the computing device from which the request to transmit the draft code to platform 136 was received at step #57); and, at step #60, receive data from platform 124 indicating whether the peer developer of environment 122 determined the draft code conforms to the requirement(s).

At step #61, responsive to a determination by system 170 (e.g., based on the data received from platform 124) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #62, system 170 may transmit, to the computing device of platform 124 (e.g., via the interface of module 180), the data indicating the portion of the draft code that fails to conform to the requirement(s) and/or the requirement(s) with which the portion of the draft code fails to conform.

At step #63, system 170 may receive, from a computing device of platform 124 (e.g., via the interface of module 180), a request to transmit draft code to platform 136, and system 170 may identify (e.g., based on the request being received via the interface of module 180) the requirement set for the SVN system associated with module 180.

At step #64, responsive to system 170 identifying the requirement set for the SVN system associated with module 180, module 194 may cause system 170 to store data in memory 176 indicating receipt of the request from the computing device of platform 124, and module 192 may cause system 170 to determine whether the draft code conforms to one or more requirements in the requirement set for the SVN system associated with module 180.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by a peer developer of environment 122, system 170 may generate a peer-review request comprising and/or identifying the draft code, and system 170 may (e.g., via the interface of module 180), at step #65, transmit the peer-review request to a computing device of platform 124 associated with a peer developer of environment 122 (e.g., a computing device of platform 124 different from the computing device from which the request to transmit the draft code to platform 136 was received at step #63); and, at step #66, receive data from platform 124 indicating whether the peer developer of environment 122 determined the draft code conforms to the requirement(s).

The draft code may comprise code system 170 previously determined failed to conform to the requirement(s), and system 170 may determine (e.g., based on the data received from platform 124) that the draft code conforms to the requirement(s). For example, the draft code may comprise code from the draft code the computing device of platform 124 requested be transmitted to platform 136 at step #57 revised to conform to the requirement(s) (e.g., based on the data transmitted to the computing device of platform 124 at step #62).

At step #67, responsive to a determination by system 170 (e.g., based on the data received from platform 124) that the peer developer of environment 122 determined the draft code conforms to the requirement(s), module 194 may cause system 170 to store data in memory 176 indicating the peer developer of environment 122 determined the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by peer developers of environments 102 and 142, and system 170 may (e.g., via the interface of module 180), at step #68, transmit the peer-review request to platform 104; referring to FIG. 2E, at step #69, transmit the peer-review request to platform 144; at step #70, receive data from platform 104 indicating whether a peer developer of environment 102 determined the draft code conforms to the requirement(s); and, at step #71, receive data from platform 144 indicating whether a peer developer of environment 142 determined the draft code conforms to the requirement(s).

At step #72, responsive to a determination by system 170 (e.g., based on the data received from platforms 104 and 144) that the peer developers of environments 102 and 142 determined the draft code conforms to the requirement(s), module 194 may cause system 170 to store data in memory 176 indicating the peer developers of environments 102 and 142 determined the draft code conforms to the requirement(s), and module 192 may cause system 170 to determine whether the draft code conforms to one or more requirements in the requirement set for the SVN system associated with module 180.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #73, transmit the draft code to host 164; at step #74, transmit the draft code to host 166; at step #75, receive data from host 164 indicating whether the vulnerability-identification service(s) verified the draft code; and, at step #76, receive data from host 166 indicating whether the vulnerability-identification service(s) verified the draft code.

At step #77, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 180.

The requirement(s) may require the draft code be executed by a test platform of environment 122 that executes code corresponding to code executed by platform 136, platform 130 may execute code corresponding to code executed by platform 136, and system 170 may (e.g., via the interface of module 180), at step #78, transmit a request configured to cause platform 130 to execute the draft code; and, at step #79, receive data generated by platform 130 executing the draft code and code corresponding to code executed by platform 136.

At step #80, responsive to a determination by system 170 (e.g., based on the data generated by platform 130) that the draft code conforms to each of the requirements in the requirement set for the SVN system associated with module 180, module 194 may cause system 170 to store data in memory 176 indicating the draft code conforms to each of the requirements in the requirement set for the SVN system associated with module 180, and module 192 may cause system 170 to generate a report indicating the draft code conforms to each of the requirements in the requirement set for the SVN system associated with module 180.

The report may comprise an option to transmit the draft code to platform 136, and system 170 may (e.g., via the interface of module 180), at step #81, transmit the report to the computing device of platform 124; and, at step #82, receive data from the computing device of platform 124 indicating invocation of the option to transmit the draft code to platform 136.

At step #83, responsive to system 170 receiving the data from the computing device of platform 124 indicating invocation of the option to transmit the draft code to platform 136, module 194 may cause system 170 to store data in memory 176 indicating invocation of the option to transmit the draft code to platform 136, and system 170 may (e.g., via the interface of module 180), at step #84, transmit the draft code to platform 136; and, at step #85, receive data from platform 136 indicating receipt of the draft code.

Referring to FIG. 2F, at step #86, responsive to system 170 receiving the data from platform 136 indicating receipt of the draft code, module 194 may cause system 170 to store data in memory 176 indicating receipt of the draft code by platform 136, and, at step #87, system 170 may transmit, to the computing device of platform 124 (e.g., via the interface of module 180), data confirming transmission of the draft code to platform 136.

At step #88, system 170 may receive, from a computing device of platform 126 (e.g., via the interface of module 182), a request to transmit draft code to platform 138, and system 170 may identify (e.g., based on the request being received via the interface of module 182) the requirement set for the SVN system associated with module 182.

At step #89, responsive to system 170 identifying the requirement set for the SVN system associated with module 182, module 194 may cause system 170 to store data in memory 176 indicating receipt of the request from the computing device of platform 126, and module 192 may cause system 170 to determine whether the draft code conforms to one or more requirements in the requirement set for the SVN system associated with module 182.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by a peer developer of environment 122, system 170 may generate a peer-review request comprising and/or identifying the draft code, and system 170 may (e.g., via the interface of module 182), at step #90, transmit the peer-review request to a computing device of platform 126 associated with a peer developer of environment 122 (e.g., a computing device of platform 126 different from the computing device from which the request to transmit the draft code to platform 138 was received at step #88); and, at step #91, receive data from platform 126 indicating whether the peer developer of environment 122 determined the draft code conforms to the requirement(s).

At step #92, responsive to a determination by system 170 (e.g., based on the data received from platform 126) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #93, system 170 may transmit, to the computing device of platform 126 (e.g., via the interface of module 182), the data indicating the portion of the draft code that fails to conform to the requirement(s) and/or the requirement(s) with which the portion of the draft code fails to conform.

At step #94, system 170 may receive, from a computing device of platform 126 (e.g., via the interface of module 182), a request to transmit draft code to platform 138, and system 170 may identify (e.g., based on the request being received via the interface of module 182) the requirement set for the SVN system associated with module 182.

At step #95, responsive to system 170 identifying the requirement set for the SVN system associated with module 182, module 194 may cause system 170 to store data in memory 176 indicating receipt of the request from the computing device of platform 126, and module 192 may cause system 170 to determine whether the draft code conforms to one or more requirements in the requirement set for the SVN system associated with module 182.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by a peer developer of environment 122, system 170 may generate a peer-review request comprising and/or identifying the draft code, and system 170 may (e.g., via the interface of module 182), at step #96, transmit the peer-review request to a computing device of platform 126 associated with a peer developer of environment 122 (e.g., a computing device of platform 126 different from the computing device from which the request to transmit the draft code to platform 138 was received at step #94); and, at step #97, receive data from platform 126 indicating whether the peer developer of environment 122 determined the draft code conforms to the requirement(s).

The draft code may comprise code system 170 previously determined failed to conform to the requirement(s), and system 170 may determine (e.g., based on the data received from platform 126) that the draft code conforms to the requirement(s). For example, the draft code may comprise code from the draft code the computing device of platform 126 requested be transmitted to platform 138 at step #88 revised to conform to the requirement(s) (e.g., based on the data transmitted to the computing device of platform 126 at step #93).

At step #98, responsive to a determination by system 170 (e.g., based on the data received from platform 126) that the peer developer of environment 122 determined the draft code conforms to the requirement(s), module 194 may cause system 170 to store data in memory 176 indicating the peer developer of environment 122 determined the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by peer developers of environments 102 and 142, and system 170 may (e.g., via the interface of module 182), at step #99, transmit the peer-review request to platform 106; at step #100, transmit the peer-review request to platform 146; at step #101, receive data from platform 106 indicating whether a peer developer of environment 102 determined the draft code conforms to the requirement(s); and, at step #102, receive data from platform 146 indicating whether a peer developer of environment 142 determined the draft code conforms to the requirement(s).

Referring to FIG. 2G, at step #103, responsive to a determination by system 170 (e.g., based on the data received from platforms 106 and 146) that the peer developers of environments 102 and 142 determined the draft code conforms to the requirement(s), module 194 may cause system 170 to store data in memory 176 indicating the peer developers of environments 102 and 142 determined the draft code conforms to the requirement(s), and module 192 may cause system 170 to determine whether the draft code conforms to one or more requirements in the requirement set for the SVN system associated with module 182.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #104, transmit the draft code to host 164; at step #105, transmit the draft code to host 166; at step #106, receive data from host 164 indicating whether the vulnerability-identification service(s) verified the draft code; and, at step #107, receive data from host 166 indicating whether the vulnerability-identification service(s) verified the draft code.

At step #108, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 182.

The requirement(s) may require the draft code be executed by a test platform of environment 122 that executes code corresponding to code executed by platform 138, platform 132 may execute code corresponding to code executed by platform 138, and system 170 may (e.g., via the interface of module 182), at step #109, transmit a request configured to cause platform 132 to execute the draft code; and, at step #110, receive data generated by platform 132 executing the draft code and code corresponding to code executed by platform 138.

At step #111, responsive to a determination by system 170 (e.g., based on the data generated by platform 132) that the draft code conforms to each of the requirements in the requirement set for the SVN system associated with module 182, module 194 may cause system 170 to store data in memory 176 indicating the draft code conforms to each of the requirements in the requirement set for the SVN system associated with module 182, and module 192 may cause system 170 to generate a report indicating the draft code conforms to each of the requirements in the requirement set for the SVN system associated with module 182.

The report may comprise an option to transmit the draft code to platform 138, and system 170 may (e.g., via the interface of module 182), at step #112, transmit the report to the computing device of platform 126; and, at step #113, receive data from the computing device of platform 126 indicating invocation of the option to transmit the draft code to platform 138.

At step #114, responsive to system 170 receiving the data from the computing device of platform 126 indicating invocation of the option to transmit the draft code to platform 138, module 194 may cause system 170 to store data in memory 176 indicating invocation of the option to transmit the draft code to platform 138, and system 170 may (e.g., via the interface of module 182), at step #115, transmit the draft code to platform 138; and, at step #116, receive data from platform 138 indicating receipt of the draft code.

At step #117, responsive to system 170 receiving the data from platform 138 indicating receipt of the draft code, module 194 may cause system 170 to store data in memory 176 indicating receipt of the draft code by platform 138, and, at step #118, system 170 may transmit, to the computing device of platform 126 (e.g., via the interface of module 182), data confirming transmission of the draft code to platform 138.

At step #119, system 170 may receive, from a computing device of platform 144 (e.g., via the interface of module 180), a request to transmit draft code to platform 156, and system 170 may identify (e.g., based on the request being received via the interface of module 180) the requirement set for the SVN system associated with module 180.

Referring to FIG. 2H, at step #120, responsive to system 170 identifying the requirement set for the SVN system associated with module 180, module 194 may cause system 170 to store data in memory 176 indicating receipt of the request from the computing device of platform 144, and module 192 may cause system 170 to determine whether the draft code conforms to one or more requirements in the requirement set for the SVN system associated with module 180.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by a peer developer of environment 142, system 170 may generate a peer-review request comprising and/or identifying the draft code, and system 170 may (e.g., via the interface of module 180), at step #121, transmit the peer-review request to a computing device of platform 144 associated with a peer developer of environment 142 (e.g., a computing device of platform 144 different from the computing device from which the request to transmit the draft code to platform 156 was received at step #119); and, at step #122, receive data from platform 144 indicating whether the peer developer of environment 142 determined the draft code conforms to the requirement(s).

At step #123, responsive to a determination by system 170 (e.g., based on the data received from platform 144) that the peer developer of environment 142 determined the draft code conforms to the requirement(s), module 194 may cause system 170 to store data in memory 176 indicating the peer developer of environment 142 determined the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by peer developers of environments 102 and 122, and system 170 may (e.g., via the interface of module 180), at step #124, transmit the peer-review request to platform 104; at step #125, transmit the peer-review request to platform 124; at step #126, receive data from platform 104 indicating whether a peer developer of environment 102 determined the draft code conforms to the requirement(s); and, at step #127, receive data from platform 124 indicating whether a peer developer of environment 122 determined the draft code conforms to the requirement(s).

At step #128, responsive to a determination by system 170 (e.g., based on the data received from platforms 104 and/or 124) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #129, system 170 may transmit, to the computing device of platform 144 (e.g., via the interface of module 180), the data indicating the portion of the draft code that fails to conform to the requirement(s) and/or the requirement(s) with which the portion of the draft code fails to conform.

At step #130, system 170 may receive, from a computing device of platform 144 (e.g., via the interface of module 180), a request to transmit draft code to platform 156, and system 170 may identify (e.g., based on the request being received via the interface of module 180) the requirement set for the SVN system associated with module 180.

At step #131, responsive to system 170 identifying the requirement set for the SVN system associated with module 180, module 194 may cause system 170 to store data in memory 176 indicating receipt of the request from the computing device of platform 144, and module 192 may cause system 170 to determine whether the draft code conforms to one or more requirements in the requirement set for the SVN system associated with module 180.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by a peer developer of environment 142, system 170 may generate a peer-review request comprising and/or identifying the draft code, and system 170 may (e.g., via the interface of module 180), at step #132, transmit the peer-review request to a computing device of platform 144 associated with a peer developer of environment 142 (e.g., a computing device of platform 144 different from the computing device from which the request to transmit the draft code to platform 156 was received at step #130); and, at step #133, receive data from platform 144 indicating whether the peer developer of environment 142 determined the draft code conforms to the requirement(s).

At step #134, responsive to a determination by system 170 (e.g., based on the data received from platform 144) that the peer developer of environment 142 determined the draft code conforms to the requirement(s), module 194 may cause system 170 to store data in memory 176 indicating the peer developer of environment 142 determined the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by peer developers of environments 102 and 122, and system 170 may (e.g., via the interface of module 180), at step #135, transmit the peer-review request to platform 104; at step #136, transmit the peer-review request to platform 124; referring to FIG. 2I, at step #137, receive data from platform 104 indicating whether a peer developer of environment 102 determined the draft code conforms to the requirement(s); and, at step #138, receive data from platform 124 indicating whether a peer developer of environment 122 determined the draft code conforms to the requirement(s).

The draft code may comprise code system 170 previously determined failed to conform to the requirement(s), and system 170 may determine (e.g., based on the data received from platforms 104 and 124) that the draft code conforms to the requirement(s). For example, the draft code may comprise code from the draft code the computing device of platform 144 requested be transmitted to platform 156 at step #119 revised to conform to the requirement(s) (e.g., based on the data transmitted to the computing device of platform 144 at step #129).

At step #139, responsive to a determination by system 170 (e.g., based on the data received from platforms 104 and 124) that the peer developers of environments 102 and 122 determined the draft code conforms to the requirement(s), module 194 may cause system 170 to store data in memory 176 indicating the peer developers of environments 102 and 122 determined the draft code conforms to the requirement(s), and module 192 may cause system 170 to determine whether the draft code conforms to one or more requirements in the requirement set for the SVN system associated with module 180.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #140, transmit the draft code to host 164; at step #141, transmit the draft code to host 166; at step #142, receive data from host 164 indicating whether the vulnerability-identification service(s) verified the draft code; and, at step #143, receive data from host 166 indicating whether the vulnerability-identification service(s) verified the draft code.

At step #144, responsive to a determination by system 170 (e.g., based on the data received from hosts 164 and/or 166) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #145, system 170 may transmit, to the computing device of platform 144 (e.g., via the interface of module 180), the data indicating the portion of the draft code that fails to conform to the requirement(s) and/or the requirement(s) with which the portion of the draft code fails to conform.

At step #146, system 170 may receive, from a computing device of platform 144 (e.g., via the interface of module 180), a request to transmit draft code to platform 156, and system 170 may identify (e.g., based on the request being received via the interface of module 180) the requirement set for the SVN system associated with module 180.

At step #147, responsive to system 170 identifying the requirement set for the SVN system associated with module 180, module 194 may cause system 170 to store data in memory 176 indicating receipt of the request from the computing device of platform 144, and module 192 may cause system 170 to determine whether the draft code conforms to one or more requirements in the requirement set for the SVN system associated with module 180.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by a peer developer of environment 142, system 170 may generate a peer-review request comprising and/or identifying the draft code, and system 170 may (e.g., via the interface of module 180), at step #148, transmit the peer-review request to a computing device of platform 144 associated with a peer developer of environment 142 (e.g., a computing device of platform 144 different from the computing device from which the request to transmit the draft code to platform 156 was received at step #146); and, at step #149, receive data from platform 144 indicating whether the peer developer of environment 142 determined the draft code conforms to the requirement(s).

At step #150, responsive to a determination by system 170 (e.g., based on the data received from platform 144) that the peer developer of environment 142 determined the draft code conforms to the requirement(s), module 194 may cause system 170 to store data in memory 176 indicating the peer developer of environment 142 determined the draft code conforms to the requirement(s), and module 192 may cause system 170 to determine whether the draft code conforms to one or more requirements in the requirement set for the SVN system associated with module 180.

The requirement(s) may comprise a peer-review requirement requiring the draft code be reviewed by peer developers of environments 102 and 122, and system 170 may (e.g., via the interface of module 180), at step #151, transmit the peer-review request to platform 104; at step #152, transmit the peer-review request to platform 124; at step #153, receive data from platform 104 indicating whether a peer developer of environment 102 determined the draft code conforms to the requirement(s); and, referring to FIG. 2J, at step #154, receive data from platform 124 indicating whether a peer developer of environment 122 determined the draft code conforms to the requirement(s).

At step #155, responsive to a determination by system 170 (e.g., based on the data received from platforms 104 and 124) that the peer developers of environments 102 and 122 determined the draft code conforms to the requirement(s), module 194 may cause system 170 to store data in memory 176 indicating the peer developers of environments 102 and 122 determined the draft code conforms to the requirement(s), and module 192 may cause system 170 to determine whether the draft code conforms to one or more requirements in the requirement set for the SVN system associated with module 180.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #156, transmit the draft code to host 164; at step #157, transmit the draft code to host 166; at step #158, receive data from host 164 indicating whether the vulnerability-identification service(s) verified the draft code; and, at step #159, receive data from host 166 indicating whether the vulnerability-identification service(s) verified the draft code.

The draft code may comprise code system 170 previously determined failed to conform to the requirement(s), and system 170 may determine (e.g., based on the data received from hosts 164 and 166) that the draft code conforms to the requirement(s). For example, the draft code may comprise code from the draft code the computing device of platform 144 requested be transmitted to platform 156 at step #130 revised to conform to the requirement(s) (e.g., based on the data transmitted to the computing device of platform 144 at step #145).

At step #160, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 180.

The requirement(s) may require the draft code be executed by a test platform of environment 142 that executes code corresponding to code executed by platform 156, platform 150 may execute code corresponding to code executed by platform 156, and system 170 may (e.g., via the interface of module 180), at step #161, transmit a request configured to cause platform 150 to execute the draft code; and, at step #162, receive data generated by platform 150 executing the draft code and code corresponding to code executed by platform 156.

At step #163, responsive to a determination by system 170 (e.g., based on the data generated by platform 150) that the draft code conforms to each of the requirements in the requirement set for the SVN system associated with module 180, module 194 may cause system 170 to store data in memory 176 indicating the draft code conforms to each of the requirements in the requirement set for the SVN system associated with module 180, and module 192 may cause system 170 to generate a report indicating the draft code conforms to each of the requirements in the requirement set for the SVN system associated with module 180.

The report may comprise an option to transmit the draft code to platform 156, and system 170 may (e.g., via the interface of module 180), at step #164, transmit the report to the computing device of platform 144; and, at step #165, receive data from the computing device of platform 144 indicating invocation of the option to transmit the draft code to platform 156.

At step #166, responsive to system 170 receiving the data from the computing device of platform 144 indicating invocation of the option to transmit the draft code to platform 156, module 194 may cause system 170 to store data in memory 176 indicating invocation of the option to transmit the draft code to platform 156, and system 170 may (e.g., via the interface of module 180), at step #167, transmit the draft code to platform 156; and, at step #168, receive data from platform 156 indicating receipt of the draft code.

At step #169, responsive to system 170 receiving the data from platform 156 indicating receipt of the draft code, module 194 may cause system 170 to store data in memory 176 indicating receipt of the draft code by platform 156, and, at step #170, system 170 may transmit, to the computing device of platform 144 (e.g., via the interface of module 180), data confirming transmission of the draft code to platform 156.

Referring to FIG. 2K, at step #171, system 170 may receive, from a computing device of platform 146 (e.g., via the interface of module 182), a request to transmit draft code to platform 158, and system 170 may identify (e.g., based on the request being received via the interface of module 182) the requirement set for the SVN system associated with module 182.

At step #172, responsive to system 170 identifying the requirement set for the SVN system associated with module 182, module 194 may cause system 170 to store data in memory 176 indicating receipt of the request from the computing device of platform 146, and module 192 may cause system 170 to determine whether the draft code conforms to one or more requirements in the requirement set for the SVN system associated with module 182.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by a peer developer of environment 142, system 170 may generate a peer-review request comprising and/or identifying the draft code, and system 170 may (e.g., via the interface of module 182), at step #173, transmit the peer-review request to a computing device of platform 146 associated with a peer developer of environment 142 (e.g., a computing device of platform 146 different from the computing device from which the request to transmit the draft code to platform 158 was received at step #171); and, at step #174, receive data from platform 146 indicating whether the peer developer of environment 142 determined the draft code conforms to the requirement(s).

At step #175, responsive to a determination by system 170 (e.g., based on the data received from platform 146) that the peer developer of environment 142 determined the draft code conforms to the requirement(s), module 194 may cause system 170 to store data in memory 176 indicating the peer developer of environment 142 determined the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by peer developers of environments 102 and 122, and system 170 may (e.g., via the interface of module 182), at step #176, transmit the peer-review request to platform 106; at step #177, transmit the peer-review request to platform 126; at step #178, receive data from platform 106 indicating whether a peer developer of environment 102 determined the draft code conforms to the requirement(s); and, at step #179, receive data from platform 126 indicating whether a peer developer of environment 122 determined the draft code conforms to the requirement(s).

At step #180, responsive to a determination by system 170 (e.g., based on the data received from platforms 106 and/or 126) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #181, system 170 may transmit, to the computing device of platform 146 (e.g., via the interface of module 182), the data indicating the portion of the draft code that fails to conform to the requirement(s) and/or the requirement(s) with which the portion of the draft code fails to conform.

At step #182, system 170 may receive, from a computing device of platform 146 (e.g., via the interface of module 182), a request to transmit draft code to platform 158, and system 170 may identify (e.g., based on the request being received via the interface of module 182) the requirement set for the SVN system associated with module 182.

At step #183, responsive to system 170 identifying the requirement set for the SVN system associated with module 182, module 194 may cause system 170 to store data in memory 176 indicating receipt of the request from the computing device of platform 146, and module 192 may cause system 170 to determine whether the draft code conforms to one or more requirements in the requirement set for the SVN system associated with module 182.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by a peer developer of environment 142, system 170 may generate a peer-review request comprising and/or identifying the draft code, and system 170 may (e.g., via the interface of module 182), at step #184, transmit the peer-review request to a computing device of platform 146 associated with a peer developer of environment 142 (e.g., a computing device of platform 146 different from the computing device from which the request to transmit the draft code to platform 158 was received at step #182); and, at step #185, receive data from platform 146 indicating whether the peer developer of environment 142 determined the draft code conforms to the requirement(s).

At step #186, responsive to a determination by system 170 (e.g., based on the data received from platform 146) that the peer developer of environment 142 determined the draft code conforms to the requirement(s), module 194 may cause system 170 to store data in memory 176 indicating the peer developer of environment 142 determined the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by peer developers of environments 102 and 122, and system 170 may (e.g., via the interface of module 182), at step #187, transmit the peer-review request to platform 106; referring to FIG. 2L, at step #188, transmit the peer-review request to platform 126; at step #189, receive data from platform 106 indicating whether a peer developer of environment 102 determined the draft code conforms to the requirement(s); and, at step #190, receive data from platform 126 indicating whether a peer developer of environment 122 determined the draft code conforms to the requirement(s).

The draft code may comprise code system 170 previously determined failed to conform to the requirement(s), and system 170 may determine (e.g., based on the data received from platforms 106 and 126) that the draft code conforms to the requirement(s). For example, the draft code may comprise code from the draft code the computing device of platform 146 requested be transmitted to platform 158 at step #171 revised to conform to the requirement(s) (e.g., based on the data transmitted to the computing device of platform 146 at step #181).

At step #191, responsive to a determination by system 170 (e.g., based on the data received from platforms 106 and 126) that the peer developers of environments 102 and 122 determined the draft code conforms to the requirement(s), module 194 may cause system 170 to store data in memory 176 indicating the peer developers of environments 102 and 122 determined the draft code conforms to the requirement(s), and module 192 may cause system 170 to determine whether the draft code conforms to one or more requirements in the requirement set for the SVN system associated with module 182.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #192, transmit the draft code to host 164; at step #193, transmit the draft code to host 166; at step #194, receive data from host 164 indicating whether the vulnerability-identification service(s) verified the draft code; and, at step #195, receive data from host 166 indicating whether the vulnerability-identification service(s) verified the draft code.

At step #196, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 182.

The requirement(s) may require the draft code be executed by a test platform of environment 142 that executes code corresponding to code executed by platform 158, platform 152 may execute code corresponding to code executed by platform 158, and system 170 may (e.g., via the interface of module 182), at step #197, transmit a request configured to cause platform 152 to execute the draft code; and, at step #198, receive data generated by platform 152 executing the draft code and code corresponding to code executed by platform 158.

At step #199, responsive to a determination by system 170 (e.g., based on the data generated by platform 152) that the draft code fails to conform to the requirement(s), module 194 may cause system 170 to store data in memory 176 indicating the draft code fails to conform to the requirement(s), and module 192 may cause system 170 to generate data indicating a portion of the draft code that fails to conform to the requirement(s) and/or the requirement(s) with which the portion of the draft code fails to conform, and, at step #200, system 170 may transmit, to the computing device of platform 146 (e.g., via the interface of module 182), the data indicating the portion of the draft code that fails to conform to the requirement(s) and/or the requirement(s) with which the portion of the draft code fails to conform.

At step #201, system 170 may receive, from a computing device of platform 146 (e.g., via the interface of module 182), a request to transmit draft code to platform 158, and system 170 may identify (e.g., based on the request being received via the interface of module 182) the requirement set for the SVN system associated with module 182.

At step #202, responsive to system 170 identifying the requirement set for the SVN system associated with module 182, module 194 may cause system 170 to store data in memory 176 indicating receipt of the request from the computing device of platform 146, and module 192 may cause system 170 to determine whether the draft code conforms to one or more requirements in the requirement set for the SVN system associated with module 182.

Responsive to a determination by system 170 (e.g., via modules 186 and/or 188) that the draft code conforms to the requirement(s), module 194 may cause system 170 to store data in memory 176 indicating the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by a peer developer of environment 142, system 170 may generate a peer-review request comprising and/or identifying the draft code, and system 170 may (e.g., via the interface of module 182), at step #203, transmit the peer-review request to a computing device of platform 146 associated with a peer developer of environment 142 (e.g., a computing device of platform 146 different from the computing device from which the request to transmit the draft code to platform 158 was received at step #201); and, at step #204, receive data from platform 146 indicating whether the peer developer of environment 142 determined the draft code conforms to the requirement(s).

Referring to FIG. 2M, at step #205, responsive to a determination by system 170 (e.g., based on the data received from platform 146) that the peer developer of environment 142 determined the draft code conforms to the requirement(s), module 194 may cause system 170 to store data in memory 176 indicating the peer developer of environment 142 determined the draft code conforms to the requirement(s), and module 192 may cause system 170 to determine whether the draft code conforms to one or more requirements in the requirement set for the SVN system associated with module 182.

The requirement(s) may comprise a peer-review requirement requiring the draft code be reviewed by peer developers of environments 102 and 122, and system 170 may (e.g., via the interface of module 182), at step #206, transmit the peer-review request to platform 106; at step #207, transmit the peer-review request to platform 126; at step #208, receive data from platform 106 indicating whether a peer developer of environment 102 determined the draft code conforms to the requirement(s); and, at step #209, receive data from platform 126 indicating whether a peer developer of environment 122 determined the draft code conforms to the requirement(s).

At step #210, responsive to a determination by system 170 (e.g., based on the data received from platforms 106 and 126) that the peer developers of environments 102 and 122 determined the draft code conforms to the requirement(s), module 194 may cause system 170 to store data in memory 176 indicating the peer developers of environments 102 and 122 determined the draft code conforms to the requirement(s), and module 192 may cause system 170 to determine whether the draft code conforms to one or more requirements in the requirement set for the SVN system associated with module 182.

The requirement(s) may require the draft code be verified by one or more vulnerability-identification services associated with hosts 164 and 166, module 190 may comprise one or more APIs of the vulnerability-identification service(s), and system 170 may (e.g., via the API(s) of module 190), at step #211, transmit the draft code to host 164; at step #212, transmit the draft code to host 166; at step #213, receive data from host 164 indicating whether the vulnerability-identification service(s) verified the draft code; and, at step #214, receive data from host 166 indicating whether the vulnerability-identification service(s) verified the draft code.

At step #215, responsive to a determination by system 170 (e.g., based on the data received from hosts 164 and 166) that the vulnerability-identification service(s) verified the draft code, module 194 may cause system 170 to store data in memory 176 indicating the vulnerability-identification service(s) verified the draft code, and module 192 may cause system 170 to determine whether the draft code conforms to one or more requirements in the requirement set for the SVN system associated with module 182.

The requirement(s) may require the draft code be executed by a test platform of environment 142 that executes code corresponding to code executed by platform 158, platform 152 may execute code corresponding to code executed by platform 158, and system 170 may (e.g., via the interface of module 182), at step #216, transmit a request configured to cause platform 152 to execute the draft code; and, at step #217, receive data generated by platform 152 executing the draft code and code corresponding to code executed by platform 158.

The draft code may comprise code system 170 previously determined failed to conform to the requirement(s), and system 170 may determine (e.g., based on the data generated by platform 152) that the draft code conforms to the requirement(s). For example, the draft code may comprise code from the draft code the computing device of platform 146 requested be transmitted to platform 158 at step #182 revised to conform to the requirement(s) (e.g., based on the data transmitted to the computing device of platform 146 at step #200).

At step #218, responsive to a determination by system 170 (e.g., based on the data generated by platform 152) that the draft code conforms to each of the requirements in the requirement set for the SVN system associated with module 182, module 194 may cause system 170 to store data in memory 176 indicating the draft code conforms to each of the requirements in the requirement set for the SVN system associated with module 182, and module 192 may cause system 170 to generate a report indicating the draft code conforms to each of the requirements in the requirement set for the SVN system associated with module 182.

The report may comprise an option to transmit the draft code to platform 158, and system 170 may (e.g., via the interface of module 182), at step #219, transmit the report to the computing device of platform 146; and, at step #220, receive data from the computing device of platform 146 indicating invocation of the option to transmit the draft code to platform 158.

At step #221, responsive to system 170 receiving the data from the computing device of platform 146 indicating invocation of the option to transmit the draft code to platform 158, module 194 may cause system 170 to store data in memory 176 indicating invocation of the option to transmit the draft code to platform 158, and system 170 may (e.g., via the interface of module 182), referring to FIG. 2N, at step #222, transmit the draft code to platform 158; and, at step #223, receive data from platform 158 indicating receipt of the draft code.

At step #224, responsive to system 170 receiving the data from platform 158 indicating receipt of the draft code, module 194 may cause system 170 to store data in memory 176 indicating receipt of the draft code by platform 158, and, at step #225, system 170 may transmit, to the computing device of platform 146 (e.g., via the interface of module 182), data confirming transmission of the draft code to platform 158.

Figure 3A:
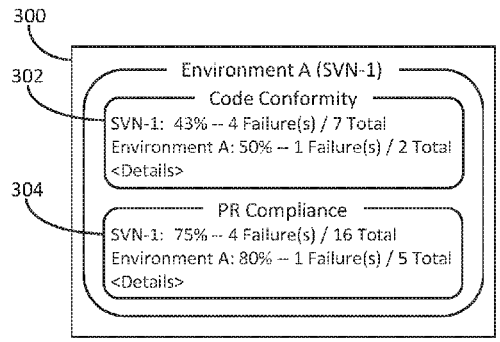
FIGS. 3A-F depict illustrative user interfaces in accordance with one or more aspects of the disclosure.

At step #226, system 170 may generate (e.g., based on data stored in memory 176 via module 194), a report for environment 102 and, at step #227, may transmit the report to one or more computing devices of platform 104. For example, referring to FIG. 3A, the report may comprise data configured to cause the computing device(s) of platform 104 to render (or display) user interface 300. Interface 300 may comprise elements 302 comparing conformity of draft code for environment 102 to the requirements in the requirement set for the SVN system associated with module 180 with conformity of draft code for environments 122 and/or 142 to the requirements in the requirement set for the SVN system associated with module 180. For example, elements 302 may indicate that system 170 determined draft code failed to conform to the requirements in the requirement set for the SVN system associated with module 180 for four of seven requests received from environments 102, 122, and 142 (e.g., a 43% compliance rate) and that system 170 determined draft code failed to conform to the requirements in the requirement set for the SVN system associated with module 180 for one of two requests received from environment 102 (e.g., a 50% compliance rate). In some embodiments, elements 302 may indicate information regarding requests received from environment 102 for which system 170 determined draft code failed to conform to the requirements in the requirement set for the SVN system associated with module 180. For example, elements 302 may indicate the request received by system 170 in step #1 and/or one or more of the portions of draft code or requirement(s) indicated by the data system 170 transmitted in step #3.

Interface 300 may also comprise elements 304 comparing conformity of environment 102 to the peer-review requirements in the requirement set for the SVN system associated with module 180 with conformity of environments 122 and/or 142 to the peer-review requirements in the requirement set for the SVN system associated with module 180. For example, elements 304 may indicate that system 170 determined peer developers of environments 102, 122, and 142 failed to identify draft code failing to conform to the requirements in the requirement set for the SVN system associated with module 180 for four of sixteen peer-review requests system 170 transmitted to environments 102, 122, and 142 (e.g., a 75% compliance rate) and that system 170 determined peer developers of environment 102 failed to identify draft code failing to conform to the requirements in the requirement set for the SVN system associated with module 180 for one of five peer-review requests system 170 transmitted to environment 102 (e.g., an 80% compliance rate). In some embodiments, elements 304 may indicate information regarding peer-review requests for which system 170 determined a peer developer of environment 102 failed to identify draft code failing to conform to the requirements in the requirement set for the SVN system associated with module 180. For example, elements 304 may indicate the peer-review request transmitted by system 170 in step #135 and/or one or more of the portions of draft code or requirement(s) indicated by the data system 170 transmitted in step #145.

Figure 3B:
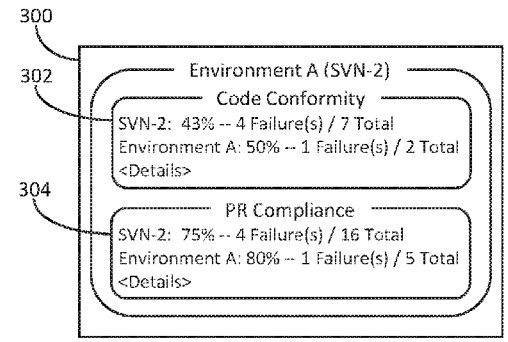

Returning to FIG. 2N, at step #228, system 170 may generate (e.g., based on data stored in memory 176 via module 194), a report for environment 102 and, at step #229, may transmit the report to one or more computing devices of platform 106. For example, referring to FIG. 3B, the report may comprise data configured to cause the computing device(s) of platform 106 to render (or display) user interface 300. Interface 300 may comprise elements 302 comparing conformity of draft code for environment 102 to the requirements in the requirement set for the SVN system associated with module 182 with conformity of draft code for environments 122 and/or 142 to the requirements in the requirement set for the SVN system associated with module 182. For example, elements 302 may indicate that system 170 determined draft code failed to conform to the requirements in the requirement set for the SVN system associated with module 182 for four of seven requests received from environments 102, 122, and 142 (e.g., a 43% compliance rate) and that system 170 determined draft code failed to conform to the requirements in the requirement set for the SVN system associated with module 182 for one of two requests received from environment 102 (e.g., a 50% compliance rate). In some embodiments, elements 302 may indicate information regarding requests received from environment 102 for which system 170 determined draft code failed to conform to the requirements in the requirement set for the SVN system associated with module 182. For example, elements 302 may indicate the request received by system 170 in step #29 and/or one or more of the portions of draft code or requirement(s) indicated by the data system 170 transmitted in step #31.

Interface 300 may also comprise elements 304 comparing conformity of environment 102 to the peer-review requirements in the requirement set for the SVN system associated with module 182 with conformity of environments 122 and/or 142 to the peer-review requirements in the requirement set for the SVN system associated with module 182. For example, elements 304 may indicate that system 170 determined peer developers of environments 102, 122, and 142 failed to identify draft code failing to conform to the requirements in the requirement set for the SVN system associated with module 182 for four of sixteen peer-review requests system 170 transmitted to environments 102, 122, and 142 (e.g., a 75% compliance rate) and that system 170 determined peer developers of environment 102 failed to identify draft code failing to conform to the requirements in the requirement set for the SVN system associated with module 182 for one of five peer-review requests system 170 transmitted to environment 102 (e.g., an 80% compliance rate). In some embodiments, elements 304 may indicate information regarding peer-review requests for which system 170 determined a peer developer of environment 102 failed to identify draft code failing to conform to the requirements in the requirement set for the SVN system associated with module 182. For example, elements 304 may indicate the peer-review request transmitted by system 170 in step #187 and/or one or more of the portions of draft code or requirement(s) indicated by the data system 170 transmitted in step #200.

Figure 3C:
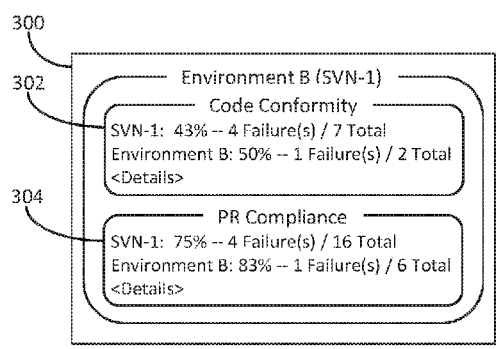

Returning to FIG. 2N, at step #230, system 170 may generate (e.g., based on data stored in memory 176 via module 194), a report for environment 122 and, at step #231, may transmit the report to one or more computing devices of platform 124. For example, referring to FIG. 3C, the report may comprise data configured to cause the computing device(s) of platform 124 to render (or display) user interface 300. Interface 300 may comprise elements 302 comparing conformity of draft code for environment 122 to the requirements in the requirement set for the SVN system associated with module 180 with conformity of draft code for environments 102 and/or 142 to the requirements in the requirement set for the SVN system associated with module 180. For example, elements 302 may indicate that system 170 determined draft code failed to conform to the requirements in the requirement set for the SVN system associated with module 180 for four of seven requests received from environments 102, 122, and 142 (e.g., a 43% compliance rate) and that system 170 determined draft code failed to conform to the requirements in the requirement set for the SVN system associated with module 180 for one of two requests received from environment 122 (e.g., a 50% compliance rate). In some embodiments, elements 302 may indicate information regarding requests received from environment 122 for which system 170 determined draft code failed to conform to the requirements in the requirement set for the SVN system associated with module 180. For example, elements 302 may indicate the request received by system 170 in step #57 and/or one or more of the portions of draft code or requirement(s) indicated by the data system 170 transmitted in step #62.

Interface 300 may also comprise elements 304 comparing conformity of environment 122 to the peer-review requirements in the requirement set for the SVN system associated with module 180 with conformity of environments 102 and/or 142 to the peer-review requirements in the requirement set for the SVN system associated with module 180. For example, elements 304 may indicate that system 170 determined peer developers of environments 102, 122, and 142 failed to identify draft code failing to conform to the requirements in the requirement set for the SVN system associated with module 180 for four of sixteen peer-review requests system 170 transmitted to environments 102, 122, and 142 (e.g., a 75% compliance rate) and that system 170 determined peer developers of environment 122 failed to identify draft code failing to conform to the requirements in the requirement set for the SVN system associated with module 180 for one of six peer-review requests system 170 transmitted to environment 122 (e.g., an 83% compliance rate). In some embodiments, elements 304 may indicate information regarding peer-review requests for which system 170 determined a peer developer of environment 122 failed to identify draft code failing to conform to the requirements in the requirement set for the SVN system associated with module 180. For example, elements 304 may indicate the peer-review request transmitted by system 170 in step #136 and/or one or more of the portions of draft code or requirement(s) indicated by the data system 170 transmitted in step #145.

Figure 3D:
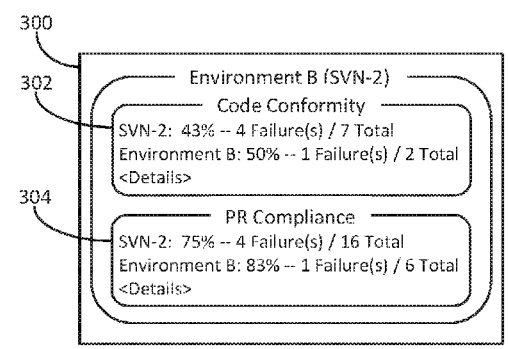

Returning to FIG. 2N, at step #232, system 170 may generate (e.g., based on data stored in memory 176 via module 194), a report for environment 122 and, at step #233, may transmit the report to one or more computing devices of platform 126. For example, referring to FIG. 3D, the report may comprise data configured to cause the computing device(s) of platform 126 to render (or display) user interface 300. Interface 300 may comprise elements 302 comparing conformity of draft code for environment 122 to the requirements in the requirement set for the SVN system associated with module 182 with conformity of draft code for environments 102 and/or 142 to the requirements in the requirement set for the SVN system associated with module 182. For example, elements 302 may indicate that system 170 determined draft code failed to conform to the requirements in the requirement set for the SVN system associated with module 182 for four of seven requests received from environments 102, 122, and 142 (e.g., a 43% compliance rate) and that system 170 determined draft code failed to conform to the requirements in the requirement set for the SVN system associated with module 182 for one of two requests received from environment 122 (e.g., a 50% compliance rate). In some embodiments, elements 302 may indicate information regarding requests received from environment 122 for which system 170 determined draft code failed to conform to the requirements in the requirement set for the SVN system associated with module 182. For example, elements 302 may indicate the request received by system 170 in step #88 and/or one or more of the portions of draft code or requirement(s) indicated by the data system 170 transmitted in step #93.

Interface 300 may also comprise elements 304 comparing conformity of environment 122 to the peer-review requirements in the requirement set for the SVN system associated with module 182 with conformity of environments 102 and/or 142 to the peer-review requirements in the requirement set for the SVN system associated with module 182. For example, elements 304 may indicate that system 170 determined peer developers of environments 102, 122, and 142 failed to identify draft code failing to conform to the requirements in the requirement set for the SVN system associated with module 182 for four of sixteen peer-review requests system 170 transmitted to environments 102, 122, and 142 (e.g., a 75% compliance rate) and that system 170 determined peer developers of environment 122 failed to identify draft code failing to conform to the requirements in the requirement set for the SVN system associated with module 182 for one of six peer-review requests system 170 transmitted to environment 122 (e.g., an 83% compliance rate). In some embodiments, elements 304 may indicate information regarding peer-review requests for which system 170 determined a peer developer of environment 122 failed to identify draft code failing to conform to the requirements in the requirement set for the SVN system associated with module 182. For example, elements 304 may indicate the peer-review request transmitted by system 170 in step #188 and/or one or more of the portions of draft code or requirement(s) indicated by the data system 170 transmitted in step #200.

Figure 3E:
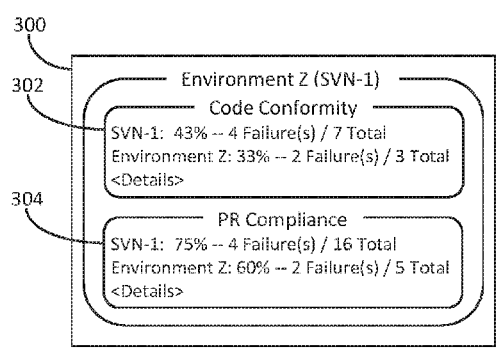

Returning to FIG. 2N, at step #234, system 170 may generate (e.g., based on data stored in memory 176 via module 194), a report for environment 142 and, at step #235, may transmit the report to one or more computing devices of platform 144. For example, referring to FIG. 3E, the report may comprise data configured to cause the computing device(s) of platform 144 to render (or display) user interface 300. Interface 300 may comprise elements 302 comparing conformity of draft code for environment 142 to the requirements in the requirement set for the SVN system associated with module 180 with conformity of draft code for environments 102 and/or 122 to the requirements in the requirement set for the SVN system associated with module 180. For example, elements 302 may indicate that system 170 determined draft code failed to conform to the requirements in the requirement set for the SVN system associated with module 180 for four of seven requests received from environments 102, 122, and 142 (e.g., a 43% compliance rate) and that system 170 determined draft code failed to conform to the requirements in the requirement set for the SVN system associated with module 180 for two of three requests received from environment 142 (e.g., a 33% compliance rate). In some embodiments, elements 302 may indicate information regarding requests received from environment 142 for which system 170 determined draft code failed to conform to the requirements in the requirement set for the SVN system associated with module 180. For example, elements 302 may indicate the requests received by system 170 in steps #119 and #130 and/or one or more of the portions of draft code or requirement(s) indicated by the data system 170 transmitted in steps #129 and #145.

Interface 300 may also comprise elements 304 comparing conformity of environment 142 to the peer-review requirements in the requirement set for the SVN system associated with module 180 with conformity of environments 102 and/or 122 to the peer-review requirements in the requirement set for the SVN system associated with module 180. For example, elements 304 may indicate that system 170 determined peer developers of environments 102, 122, and 142 failed to identify draft code failing to conform to the requirements in the requirement set for the SVN system associated with module 180 for four of sixteen peer-review requests system 170 transmitted to environments 102, 122, and 142 (e.g., a 75% compliance rate) and that system 170 determined peer developers of environment 142 failed to identify draft code failing to conform to the requirements in the requirement set for the SVN system associated with module 180 for two of five peer-review requests system 170 transmitted to environment 142 (e.g., a 60% compliance rate). In some embodiments, elements 304 may indicate information regarding peer-review requests for which system 170 determined a peer developer of environment 142 failed to identify draft code failing to conform to the requirements in the requirement set for the SVN system associated with module 180. For example, elements 304 may indicate the peer-review requests transmitted by system 170 in steps #121 and #132 and/or one or more of the portions of draft code or requirement(s) indicated by the data system 170 transmitted in steps #129 and #145.

Figure 3F:
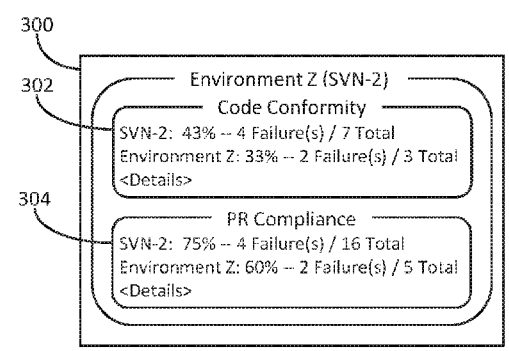

Returning to FIG. 2N, at step #236, system 170 may generate (e.g., based on data stored in memory 176 via module 194), a report for environment 142 and, at step #237, may transmit the report to one or more computing devices of platform 146. For example, referring to FIG. 3F, the report may comprise data configured to cause the computing device(s) of platform 146 to render (or display) user interface 300. Interface 300 may comprise elements 302 comparing conformity of draft code for environment 142 to the requirements in the requirement set for the SVN system associated with module 182 with conformity of draft code for environments 102 and/or 122 to the requirements in the requirement set for the SVN system associated with module 182. For example, elements 302 may indicate that system 170 determined draft code failed to conform to the requirements in the requirement set for the SVN system associated with module 182 for four of seven requests received from environments 102, 122, and 142 (e.g., a 43% compliance rate) and that system 170 determined draft code failed to conform to the requirements in the requirement set for the SVN system associated with module 182 for two of three requests received from environment 142 (e.g., a 33% compliance rate). In some embodiments, elements 302 may indicate information regarding requests received from environment 142 for which system 170 determined draft code failed to conform to the requirements in the requirement set for the SVN system associated with module 182. For example, elements 302 may indicate the requests received by system 170 in steps #171 and #182 and/or one or more of the portions of draft code or requirement(s) indicated by the data system 170 transmitted in steps #181 and #200.

Interface 300 may also comprise elements 304 comparing conformity of environment 142 to the peer-review requirements in the requirement set for the SVN system associated with module 182 with conformity of environments 102 and/or 122 to the peer-review requirements in the requirement set for the SVN system associated with module 182. For example, elements 304 may indicate that system 170 determined peer developers of environments 102, 122, and 142 failed to identify draft code failing to conform to the requirements in the requirement set for the SVN system associated with module 182 for four of sixteen peer-review requests system 170 transmitted to environments 102, 122, and 142 (e.g., a 75% compliance rate) and that system 170 determined peer developers of environment 142 failed to identify draft code failing to conform to the requirements in the requirement set for the SVN system associated with module 182 for two of five peer-review requests system 170 transmitted to environment 142 (e.g., a 60% compliance rate). In some embodiments, elements 304 may indicate information regarding peer-review requests for which system 170 determined a peer developer of environment 142 failed to identify draft code failing to conform to the requirements in the requirement set for the SVN system associated with module 182. For example, elements 304 may indicate the peer-review requests transmitted by system 170 in steps #173 and #184 and/or one or more of the portions of draft code or requirement(s) indicated by the data system 170 transmitted in steps #181 and #200.

Figure 4:
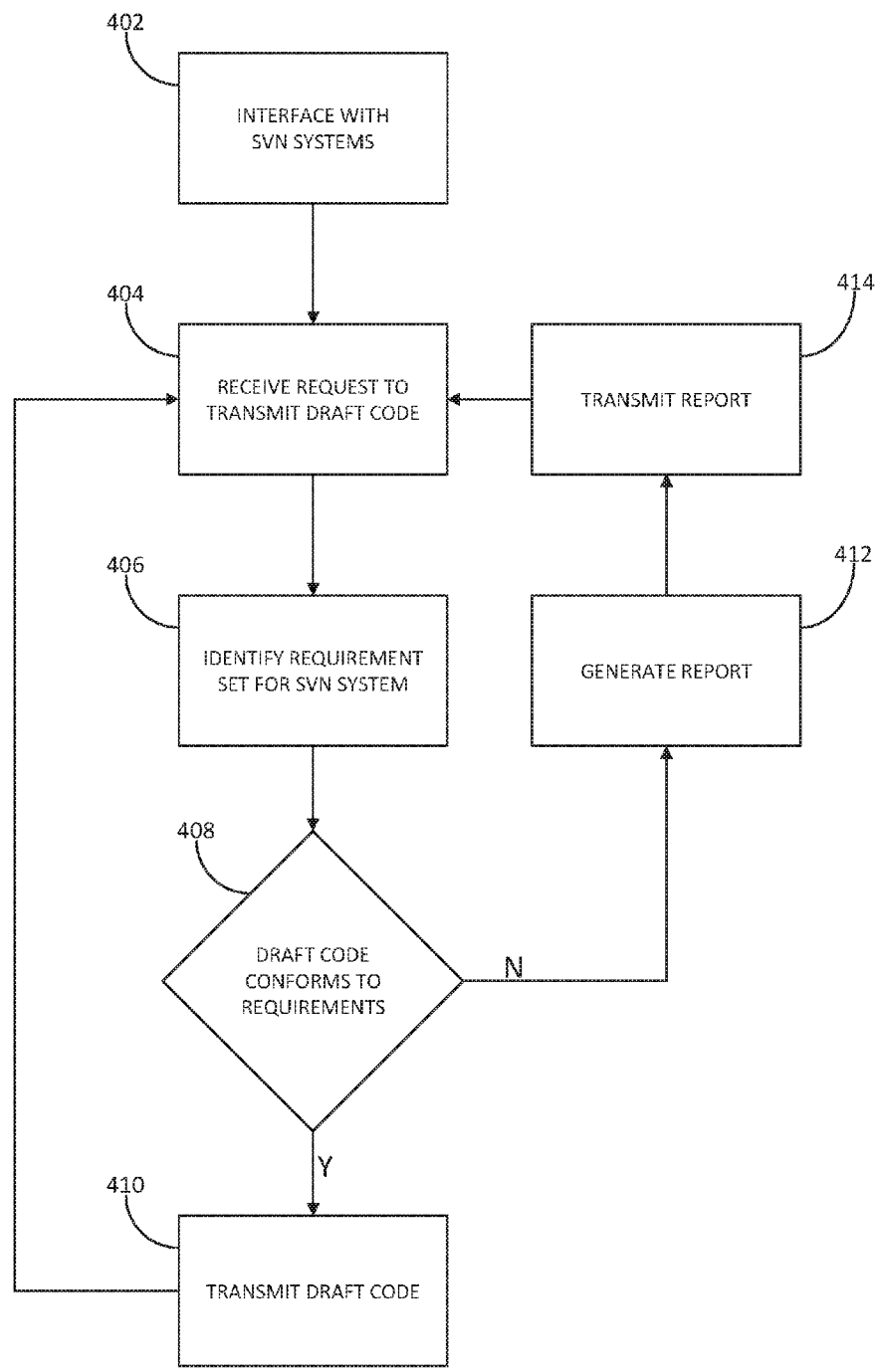
FIG. 4 depicts illustrative methods in accordance with one or more aspects of the disclosure.

FIG. 4 depicts illustrative methods in accordance with one or more aspects of the disclosure. Referring to FIG. 4, in step 402, a computing system may interface with different SVN systems via distinct interfaces. For example, system 170 may interface with an SVN system comprising platforms 104, 110, 116, 124, 130, 136, 144, 150, and 156 via the interface of module 180, and system 170 may interface with an SVN system comprising platforms 106, 112, 118, 126, 132, 138, 146, 152, and 158 via the interface of module 182. In step 404, the computing system may receive, from a development platform of one of the SVN systems and via one of the interfaces, a request to transmit draft code to a production platform of the SVN system. For example, system 170 may receive, from platform 104 and via the interface of module 180, a request to transmit draft code to platform 116.

In step 406, the computing system may identify, based on the SVN system, a set of requirements for the draft code from amongst requirement sets stored in memory. For example, system 170 may identify, based on receiving the request from platform 104 via the interface of module 180, the requirement set for the SVN system associated with module 180. In step 408, the computing system may determine whether the draft code conforms to the requirements. For example, system 170 may determine whether the draft code platform 104 requested be transmitted to platform 116 conforms to the requirements in the requirement set for the SVN system associated with module 180.

Responsive to determining the draft code conforms to the requirements, in step 410, the computing system may transmit the draft code to the production platform and return to step 404 (e.g., to await receipt of a subsequent request). For example, responsive to a determination by system 170 that the draft code platform 104 requested be transmitted to platform 116 conforms to the requirements in the requirement set for the SVN system associated with module 180, system 170 may transmit the draft code to production platform 116 via the interface of module 180.

Responsive to determining the draft code fails to conform to one or more of the requirements, the computing system may, in step 412, generate a report indicating the draft code fails to conform to the requirement(s), in step 414, transmit the report to the development platform, and return to step 404 (e.g., to await receipt of a subsequent request). For example, responsive to a determination by system 170 that the draft code platform 104 requested be transmitted to platform 116 fails to conform to one or more of the requirements in the requirement set for the SVN system associated with module 180, system 170 may generate data indicating the portion of the draft code that fails to conform to the requirement(s) and/or the requirement(s) with which the portion of the draft code fails to conform and may transmit the data to platform 104.

The functions and steps described herein may be embodied in computer-usable data or computer-executable instructions, such as in one or more modules, executed by one or more computers or other devices to perform one or more functions described herein. Generally, such modules include routines, logic, instructions, objects, components, data structures, or the like that perform particular functions or implement particular data types when executed by one or more processors of a computer or other data-processing device. The computer-executable instructions may be stored on a computer-readable medium such as a hard disk, optical disk, removable storage media, solid-state memory, or the like. The functionality of the modules may be combined or distributed as desired and may be embodied in whole or in part in firmware or hardware equivalents, such as integrated circuits, application-specific integrated circuits (ASICs), field-programmable gate arrays (FPGA), or the like. Particular data structures may be used to implement one or more aspects of the disclosure, and such data structures are contemplated to be within the scope of computer-executable instructions and computer-usable data described herein.

Various aspects described herein may be embodied as a method, system, apparatus, or one or more computer-readable media storing computer-executable instructions. Accordingly, aspects of the disclosure may take the form of an entirely hardware embodiment, an entirely software embodiment, an entirely firmware embodiment, or an embodiment combining software, hardware, or firmware aspects.

The various methods and acts described herein may be operative across one or more computing devices or networks, and the functionality described herein may be distributed or may be located in a single computing device (e.g., a server, client computer, or the like).

Aspects of the disclosure have been described in terms of illustrative embodiments. Numerous other embodiments, modifications, and variations within the scope and spirit of the appended claims will occur to persons of ordinary skill in the art from a review of this disclosure. For example, one of ordinary skill in the art will appreciate that the steps depicted in the illustrative figures may be performed in other than the recited order and that one or more depicted steps may be optional. Any and all features in the following claims may be combined or rearranged in any way possible.

What is claimed is:

1. A method comprising:
    interfacing, by a computing system comprising at least one processor and a memory, and via a plurality of distinct interfaces, with a plurality of different software versioning (SVN) systems;
    receiving, by the computing system, via an interface of the interfaces, and from a development platform of an SVN system of the SVN systems, a request to transmit draft code to a production platform of the SVN system;
    identifying, by the at least one processor and based on the SVN system, a set of requirements for the draft code from amongst a plurality of requirement sets stored in the memory; and
    responsive to determining, by the at least one processor, that the draft code conforms to the requirements, transmitting, by the computing system and via the interface, the draft code to the production platform,
    wherein determining that the draft code conforms to the requirements comprises determining that the draft code conforms to the requirements based on data received from a test platform of the SVN system via the interface and generated by the test platform executing the draft code and code corresponding to code executed by the production platform,
    wherein:
        the data generated by the test platform indicates an execution flow of at least one of the draft code into the code corresponding to the code executed by the production platform, or the code corresponding to the code executed by the production platform into the draft code; and
        determining that the draft code conforms to the requirements comprises determining that the draft code conforms to the requirements based on the execution flow, and
    wherein determining that the draft code conforms to the requirements comprises:
        determining that the draft code comprises a potential vulnerability subject to a condition;
        determining that the draft code comprises at least one of the potential vulnerability or the condition;
        determining that the code corresponding to the code executed by the production platform comprises the other of the potential vulnerability or the condition; and
        determining that at least one of the potential vulnerability or the condition conforms to the requirements.

2. The method of claim 1, comprising:
    receiving, by the computing system, via the interface, and from the development platform, a request to transmit different draft code to the production platform; and
    responsive to determining by the at least one processor that a portion of the different draft code fails to conform to one or more of the requirements:
        generating, by the at least one processor, data indicating at least one of the portion of the different draft code or the one or more of the requirements; and
        transmitting, by the computing system and via the interface, the data indicating the at least one of the portion of the different draft code or the one or more of the requirements to the development platform.

3. The method of claim 2, wherein determining that the draft code conforms to the requirements comprises determining that a portion of the draft code comprising a portion of the different draft code conforms to the one or more of the requirements.

4. The method of claim 1, wherein:
    the requirements comprise one or more peer-review requirements; and
    determining that the draft code conforms to the requirements comprises determining that the draft code conforms to the one or more peer-review requirements.

5. The method of claim 4, wherein:
    the development platform comprises a plurality of distinct computing devices;
    receiving the request comprises receiving the request from a first of the computing devices; and
    determining that the draft code conforms to the one or more peer-review requirements comprises:
        generating, by the at least one processor, a peer-review request that at least one of identifies or comprises the draft code;
        transmitting, via the interface, the peer-review request to a second of the computing devices; and
        determining that the draft code conforms to the one or more peer-review requirements based on data received, via the interface, from the second of the computing devices.

6. The method of claim 4, wherein:
    the interface interfaces the computing system with a plurality of distinct development environments of the SVN system;
    receiving the request comprises receiving the request from a computing device located in a first of the development environments; and
    determining that the draft code conforms to the one or more peer-review requirements comprises:
        generating, by the at least one processor, a peer-review request that at least one of identifies or comprises the draft code;
        transmitting, via the interface, the peer-review request to a computing device located in a second of the development environments; and
        determining that the draft code conforms to the one or more peer-review requirements based on data received, via the interface, from the computing device located in the second of the development environments.

7. The method of claim 6, wherein determining that the draft code conforms to the one or more peer-review requirements comprises:
determining, based on data received, via the interface, from a different computing device located in the first of the development environments, that the draft code conforms to at least one of the one or more peer-review requirements; and
transmitting the peer-review request to the computing device located in the second of the development environments in response to determining that the draft code conforms to the at least one of the one or more peer-review requirements.

8. The method of claim 1, wherein:
the draft code comprises source code;
the requirements comprise a syntax requirement of the SVN system; and
determining that the draft code conforms to the requirements comprises:
parsing the source code to determine a structure of the source code; and
comparing the structure to the syntax requirement.

9. The method of claim 1, wherein:
the draft code comprises source code; and
determining that the draft code conforms to the requirements comprises:
compiling the source code to generate executable code; and
determining that a structure of the executable code conforms to one or more of the requirements.

10. The method of claim 1, wherein determining that the draft code conforms to the requirements comprises:
transmitting, via an application program interface (API) of a vulnerability-identification service indicated by one or more of the requirements, the draft code to a network host associated with the service; and
determining, based on data received from the host via the API, that the draft code conforms to the one or more of the requirements.

11. The method of claim 1, comprising, responsive to determining that the draft code conforms to the requirements:
generating, by the at least one processor, a report indicating that the draft code conforms to the requirements; and
transmitting, by the computing system, via the interface, and to the development platform, the report.

12. The method of claim 11, wherein transmitting the draft code to the production platform comprises transmitting the draft code to the production platform in response to receiving, via the interface and from the development platform, data indicating invocation of an option to transmit the draft code included in the report.

13. The method of claim 1, wherein the interface interfaces the computing system with a plurality of distinct development environments, each development environment of the development environments comprising one or more computing devices of the SVN system, the method comprising, for each development environment of the development environments:
generating, by the at least one processor and based on data stored in the memory, a report comparing conformity of draft code for the development environment to the requirements with conformity of draft code for one or more other development environments of the development environments to the requirements; and
communicating, by the computing system and to at least one of the one or more computing devices, the report.

14. The method of claim 1, wherein the requirements comprise one or more peer-review requirements, wherein the interface interfaces the computing system with a plurality of distinct development environments, each development environment of the development environments comprising one or more computing devices of the SVN system, the method comprising, for each development environment of the development environments:
generating, by the at least one processor and based on data stored in the memory, a report comparing conformity of the development environment to the one or more peer-review requirements with conformity of one or more other development environments of the development environments to the one or more peer-review requirements; and
communicating, by the computing system and to at least one of the one or more computing devices, the report.

15. A computing system comprising:
at least one processor; and
a memory storing instructions that when executed by the at least one processor cause the computing system to:
interface, via a plurality of distinct interfaces, with a plurality of different software versioning (SVN) systems;
receive, via an interface of the interfaces and from a development platform of an SVN system of the SVN systems, a request to transmit draft code to a production platform of the SVN system;
identify, based on the SVN system, a set of requirements for the draft code from amongst a plurality of requirement sets stored in the memory; and
responsive to determining that the draft code conforms to the requirements, transmit, via the interface, the draft code to the production platform,
wherein determining that the draft code conforms to the requirements comprises determining that the draft code conforms to the requirements based on data received from a test platform of the SVN system via the interface and generated by the test platform executing the draft code and code corresponding to code executed by the production platform,
wherein:
the data generated by the test platform indicates an execution flow of at least one of the draft code into the code corresponding to the code executed by the production platform, or the code corresponding to the code executed by the production platform into the draft code; and
determining that the draft code conforms to the requirements comprises determining that the draft code conforms to the requirements based on the execution flow, and
wherein determining that the draft code conforms to the requirements comprises:
determining that the draft code comprises a potential vulnerability subject to a condition;
determining that the draft code comprises at least one of the potential vulnerability or the condition;
determining that the code corresponding to the code executed by the production platform comprises the other of the potential vulnerability or the condition; and determining that at least one of the potential vulnerability or the condition conforms to the requirements.

16. One or more non-transitory computer-readable media storing instructions that when executed by at least one processor of a computing system cause the computing system to:
   interface, via a plurality of distinct interfaces, with a plurality of different software versioning (SVN) systems;
   receive, via an interface of the interfaces and from a development platform of an SVN system of the SVN systems, a request to transmit draft code to a production platform of the SVN system;
   identify, based on the SVN system, a set of requirements for the draft code from amongst a plurality of requirement sets stored in a memory of the computing system; and
   responsive to determining that the draft code conforms to the requirements, transmit, via the interface, the draft code to the production platform,
   wherein determining that the draft code conforms to the requirements comprises determining that the draft code conforms to the requirements based on data received from a test platform of the SVN system via the interface and generated by the test platform executing the draft code and code corresponding to code executed by the production platform, wherein:
   the data generated by the test platform indicates an execution flow of at least one of the draft code into the code corresponding to the code executed by the production platform, or the code corresponding to the code executed by the production platform into the draft code; and
   determining that the draft code conforms to the requirements comprises determining that the draft code conforms to the requirements based on the execution flow, and wherein determining that the draft code conforms to the requirements comprises:
   determining that the draft code comprises a potential vulnerability subject to a condition;
   determining that the draft code comprises at least one of the potential vulnerability or the condition;
   determining that the code corresponding to the code executed by the production platform comprises the other of the potential vulnerability or the condition; and
   determining that at least one of the potential vulnerability or the condition conforms to the requirements.

* * * * *